(12) United States Patent
Gurevich et al.

(10) Patent No.: US 7,814,322 B2
(45) Date of Patent: Oct. 12, 2010

(54) DISCOVERY AND AUTHENTICATION SCHEME FOR WIRELESS MESH NETWORKS

(75) Inventors: David Gurevich, San Mateo, CA (US); Jose Gonzalez, San Ramon, CA (US); Scott Burke, Los Altos, CA (US)

(73) Assignee: SRI International, Menlo Park, CA (US)

( * ) Notice: Subject to any disclaimer, the term of this patent is extended or adjusted under 35 U.S.C. 154(b) by 1165 days.

(21) Appl. No.: 11/381,326

(22) Filed: May 2, 2006

(65) Prior Publication Data

US 2007/0189249 A1  Aug. 16, 2007

Related U.S. Application Data

(60) Provisional application No. 60/677,977, filed on May 3, 2005, provisional application No. 60/677,997, filed on May 3, 2005.

(51) Int. Cl.
*H04L 9/32* (2006.01)

(52) U.S. Cl. .................. 713/171; 713/168; 713/169; 455/41.2; 455/434; 455/552.1; 370/252; 370/338; 370/401; 370/406

(58) Field of Classification Search .................. None
See application file for complete search history.

(56) References Cited

U.S. PATENT DOCUMENTS

| | | | |
|---|---|---|---|
| 6,028,857 A * | 2/2000 | Poor | ........................... 370/351 |
| 6,373,952 B2 | 4/2002 | Asano et al. | |
| 6,404,739 B1 | 6/2002 | Gonno | |
| 6,845,091 B2 | 1/2005 | Ogier et al. | |
| 2003/0064752 A1 | 4/2003 | Adachi et al. | |
| 2003/0202486 A1 | 10/2003 | Anton, Jr. et al. | |
| 2004/0240412 A1 | 12/2004 | Winget | |
| 2004/0264413 A1* | 12/2004 | Kaidar et al. | ............... 370/332 |
| 2005/0063334 A1* | 3/2005 | Fnu et al. | .................... 370/329 |
| 2005/0074019 A1* | 4/2005 | Handforth et al. | ........... 370/406 |
| 2005/0165916 A1* | 7/2005 | Cromer et al. | .............. 709/220 |
| 2005/0174962 A1 | 8/2005 | Gurevich | |
| 2005/0174972 A1 | 8/2005 | Boynton | |
| 2005/0175009 A1 | 8/2005 | Bauer | |
| 2005/0265384 A1* | 12/2005 | Fernandes et al. | ........... 370/466 |
| 2006/0013159 A2 | 1/2006 | Gurevich | |
| 2006/0013169 A2 | 1/2006 | Boynton | |
| 2006/0029074 A2 | 2/2006 | Bauer | |

(Continued)

OTHER PUBLICATIONS

Session Directory Tool, http://www-mice.cs.ucl.ac.uk/multimedia/software/sdr/index.html, pp. 1-2.

(Continued)

*Primary Examiner*—Vincent P Harper
*Assistant Examiner*—Mazda Sabouri
(74) *Attorney, Agent, or Firm*—Marger Johnson & McCollum, P.C.

(57) ABSTRACT

Wireless network devices discover individual mesh nodes and networks of mesh nodes. An association is formed on the basis of peer-to-peer interactions at layer-1, layer-2 and/or higher layers of the Open System Interconnect (OSI) model. In particular, the system uses Beacon, Probe Request, Probe Response, Association Request, Association Response, and Disassociation frames and introduces a new Extensible Mesh Information Element (EMIE) used by mesh nodes to discover, authenticate, and associate with other peer nodes.

17 Claims, 15 Drawing Sheets

U.S. PATENT DOCUMENTS

| | | | |
|---|---|---|---|
| 2006/0036856 A1* | 2/2006 | Kok | 713/168 |
| 2006/0039298 A1* | 2/2006 | Zuniga et al. | 370/252 |
| 2006/0120387 A1* | 6/2006 | Yang | 370/401 |
| 2006/0218398 A1* | 9/2006 | Sood et al. | 713/168 |
| 2006/0253735 A1* | 11/2006 | Kwak et al. | 714/12 |

OTHER PUBLICATIONS

Postel, J., "User Datagram Protocol", RFC 768, Aug. 28, 1980.
Postel, J., "Transmission Control Protocol", RFC 793, Sep. 1981.
Mockapetris, P., "Domain names—concepts and facilities", RFC 1034, Nov. 1, 1987.
Mockapetris, P., "Domain names—implementation and specification", RFC 1035, Nov. 1, 1987.
Mills, D.L., Network Time Protocol (Version 3): Specification, Implementation and Analysis, RFC 1305, Mar. 1992.
Drom, R., "Dynamic Host Configuration Protocol", RFC 2131, Mar. 1997.
"Medium Access Control (MAC) and Physical (PHY) Specification, Chapter 5 General Description", pp. 9-28, ANSI/IEEE Std. 802.11, 1999 Edition.
"Medium Access Control (MAC) and Physical (PHY) Specification, Chapter 7 Frame Formats", pp. 34-58, ANSI/IEEE Std. 802.11, 1999 Edition.
ANSI/IEEE Std. 802.11-1999, IEEE Standard for Information Technology, Part 11: Wireless LAN Medium Access Control (MAC) and Physical Layer (PHY) specifications.
Aboba, B., et al., "PPP EAP TLS Authentication Protocol", RFC 2716, Oct. 1999.
Handley, M. et al., "The Reliable Multicast Design Space for Bulk Data Transfer", RFC 2887, Aug. 2000.
IEEE Std. 802.1X-2001, IEEE Standard for Local and Metropolitan Area Networks—Port-Based Network Access Control.
Whetten, B., "Reliable Multicast Transport Building Blocks for One-To-Many Bulk-Data Transfer", RFC 3048, Jan. 2001.
Speakman, T. et al., "PGM Reliable Transport Protocol Specification", RFC 3208, Dec. 2001.
Palekar, A., et al., "Protected EAP Protocol (PEAP)", Internet draft draft-josefsson-pppext-eap-tls-eap-06.txt, Mar. 2003.
Perkins, C., et al., "Ad hoc On-Demand Distance Vector (AODV) Routing", RFC 3561, Jul. 2003.
Congdon, P., et al., "IEEE 802.1X Remote Authentication Dial in User Service (RADIUS) Usage Guidelines", RFC 3580 Sep. 2003.
De Couto, D., et al., "A High-Throughput Path Metric for Multi-Hop Wireless Routing", ACM MobiCom '03, San Francisco, California, Sep. 2003.
Clausen, T., et al., "Optimized Link State Routing Protocol (OLSR)", RFC 3626, Oct. 2003.
Ogier, R., et al., "Topology Dissemination Based on Reverse-Path Forwarding (TBRPF)", RFC 3684, Feb. 2004.
Johnson, David et al., "The Dynamic Source Routing Protocol for Mobile Ad Hoc Networks (DSR)", draft-ietf-manet-dsr-10, Rice University, Jul. 19, 2004.
Adamson, B., et al., "Negative-Acknowledgment (NACK)—Oriented Reliable Multicast (NORM) Building Blocks", RFC 3941, Nov. 2004.
Adamson, B. et al., "Negative-Acknowledgment (NACK)—Oriented Reliable Multicast (NORM) Protocol", RFC 3940, Nov. 2004.
IEEE Std. 802.11i-2004, IEEE Standard for Information Technology, Part 11: Wireless LAN Medium Access Control (MAC) and Physical Layer (PHY) specifications, Amendment 6: Medium Access Control (MAC) Security Enhancements.
"An Explanation of the Automatic Metric Feature for Internet Protocol Routes", Microsoft Knowledge Base Article, Article No. 29950.
"Enable NTP Time Server (Windows 2000/XP)", http://www.winguides.com/registry/display.php/1117/. Last updated Jul. 19, 2002.
Terms and Definitions for 802.11s doc.: IEEE 802.11-04/1477r4.
IEEE 802.11 TGs Functional Requirements and Scope doc.: IEEE 802.11-04/1174r13.
IEEE 802.11 TGs Comparison Categories and Informative Checklists doc.: IEEE 802.11-04/1175r10.
Oliveira, Carlos A.S., et al., "A Survey of Combinatorial Optimization Problems in Multicast Routing", pp. 1-40, Preprint submitted to Elsevier Science Dec. 3, 2003.

* cited by examiner

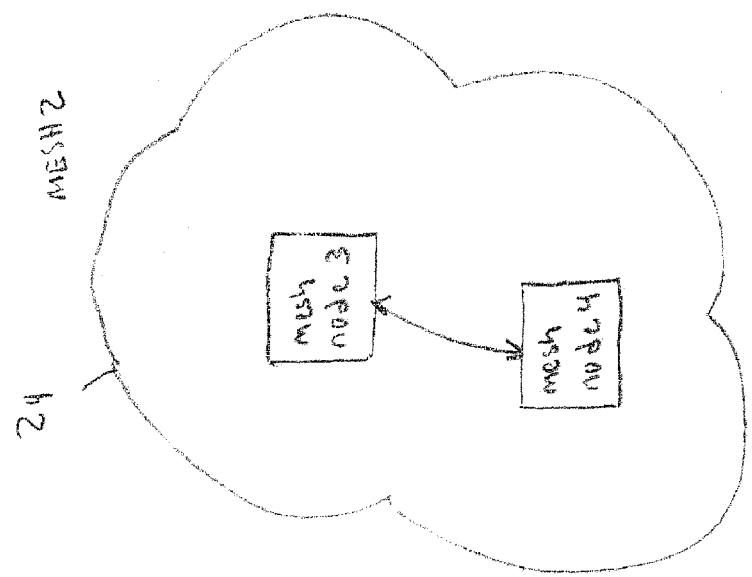
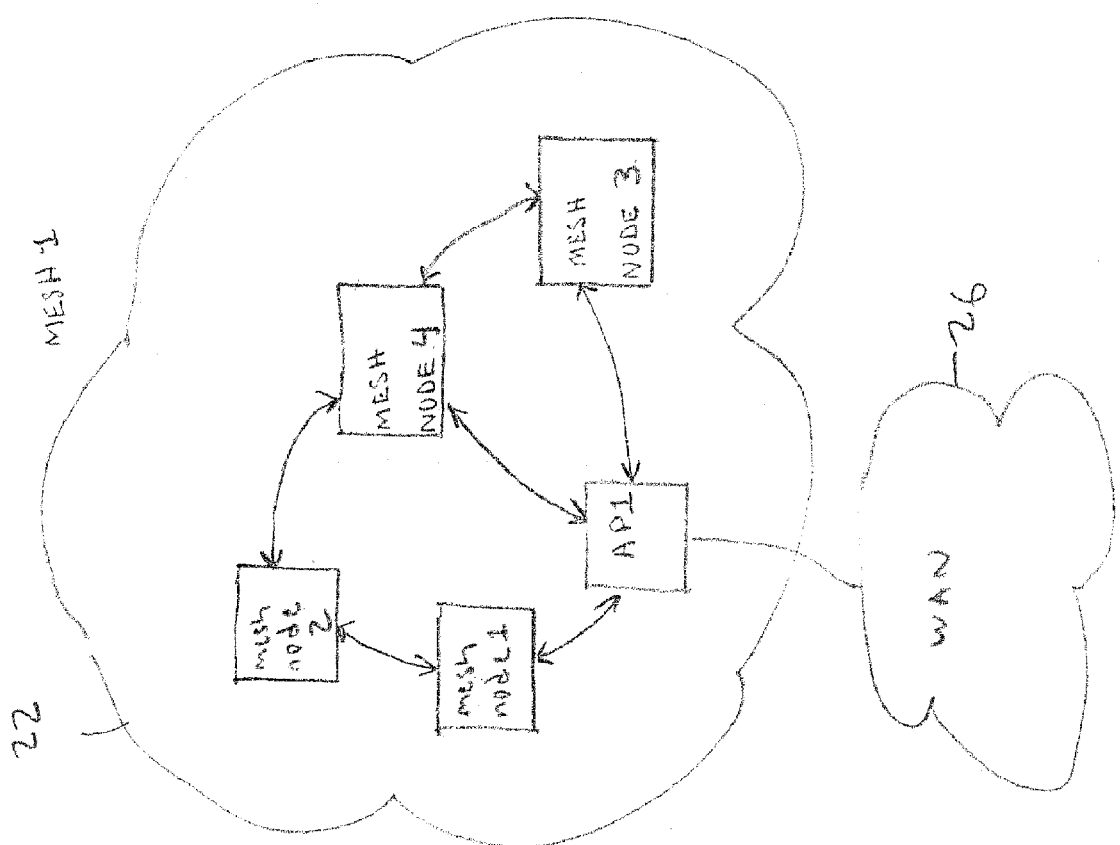
FIG. 3

DISCOVERY AND AUTHENTICATION SCHEME FOR WIRELESS MESH NETWORKS

This application claims priority from co-pending provisional patent application Ser. No. 60/677,977 entitled MESH NETWORKING AUTHENTICATION TECHNIQUES FOR WIRELESS LOCAL AREA NETWORK DEVICES, filed May 3, 2005, which is incorporated by reference in its entirety and also claims priority from co-pending provisional patent application Ser. No. 60/677,997 entitled MESH NETWORKING DISCOVERY TECHNIQUES FOR WIRELESS LOCAL AREA NETWORK DEVICES, filed May 3, 2005, which is also incorporated by reference in its entirety.

BACKGROUND

Referring to FIG. 1, the Institute of Electrical and Electronic Engineers (IEEE) 802.11 standard (802.11) defines several mechanisms for wireless devices, or nodes, to communicate. One frequently used mechanism is a Basic Service Set (BSS) 10, also known as "infrastructure mode". In the BSS 10, an end node (referred to as a station (STA)) communicates with an Access Point (AP). The AP is typically connected to a Wide Area Network (WAN) (not shown) that includes an Internet network.

Two additional mechanisms are defined in IEEE 802.11 that enable devices to communicate on a peer-to-peer basis. An Independent Basic Service Set (IBSS) 12 is alternatively referred to as an "ad hoc" mode and allows two STAs to communicate directly with each other. A Wireless Distribution Services (WDS) network 14 allows two APs to communicate directly with each other.

In the IBSS 12, nodes seek out other nodes that are members of a specific service set identified by Service Set Identifiers (SSIDs). The STAs in the IBSS network 12 seek out other nodes by listening for beacons and using a Timing Synchronization Function (TSF) value to arbitrate a Distributed Coordination Function (DCF) within the IBSS network 12. When a node finds other nodes on a particular wireless channel (a pre-defined, standardized frequency band), it will select that channel and join the IBSS network 12. If a node does not locate any other nodes with the desired SSID, it will select a wireless channel and start its own IBSS network 12. The nodes use 3-address 802.11 frames for operating within the IBSS 12. In a WDS 14, two or more APs are configured to bridge among themselves using address 0802.11 frames. The WDS 14 has no concept of a BSS 10 and all frames are forwarded point-to-point.

Either one of these two wireless frameworks can be used as the starting point, or baseline functionality, for defining a mesh discovery protocol. Both 3-address and 4-address data frames can support mesh discovery functionality. However, none of the protocols currently used for the BSS 10, IBSS 12, or WDS 14 provide the functionality required for effectively supporting dynamically changing mesh networks.

The present invention addresses this and other problems associated with the prior art.

SUMMARY OF THE INVENTION

Wireless network devices discover individual mesh nodes and networks of mesh nodes. An association is formed on the basis of peer-to-peer interactions at layer-1, layer-2 and/or higher layers of the Open System Interconnect (OSI) model. In particular, the system uses Beacon, Probe Request, Probe Response, Association Request, Association Response, and Disassociation frames and introduces a new Extensible Mesh Information Element (EMIE) used by mesh nodes to discover, authenticate, and associate with other peer nodes.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is a block diagram showing how two mesh networks are reconfigured using to the mesh discovery protocol shown in FIG. 3.

DETAILED DESCRIPTION

Figure 2:
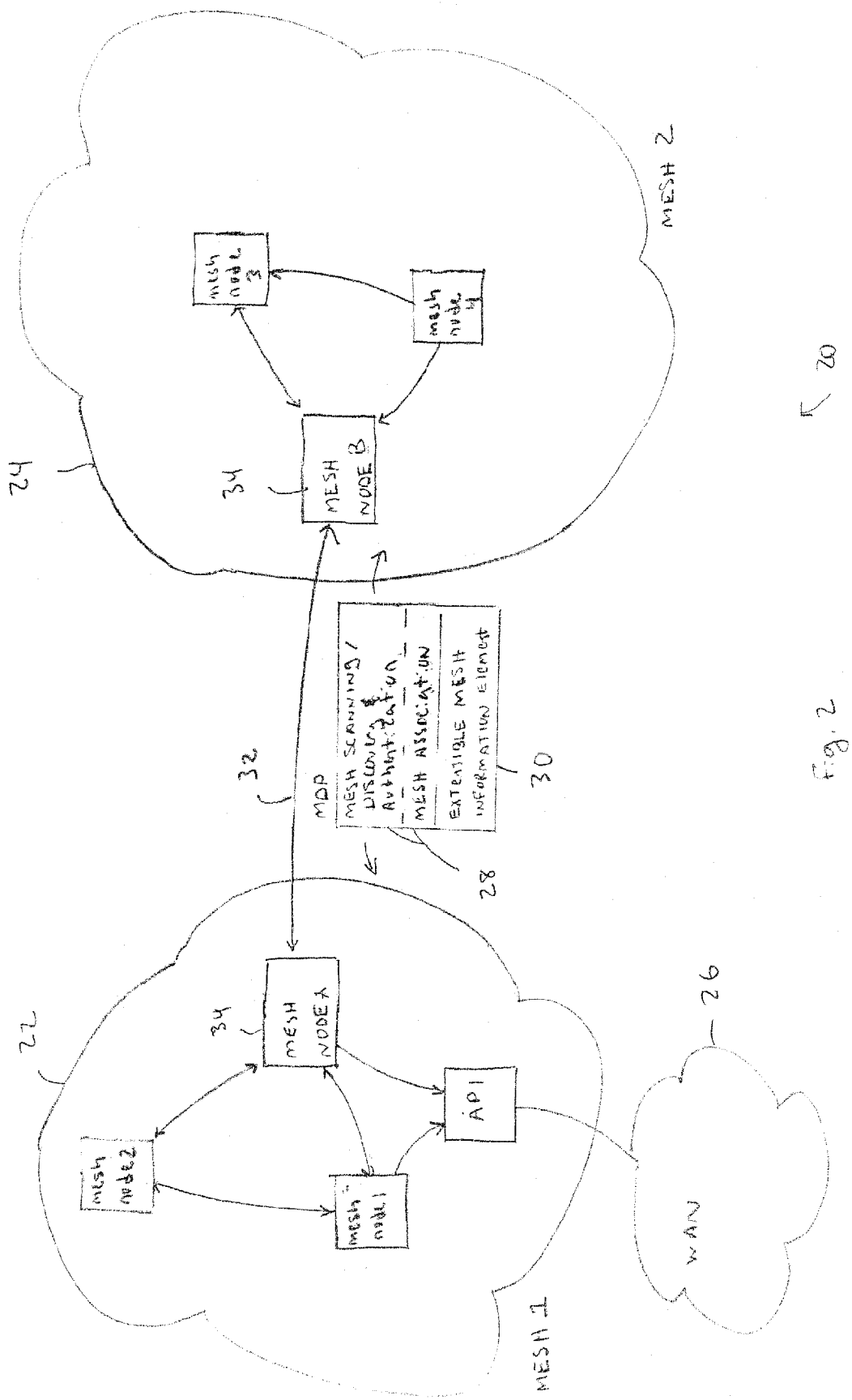
FIG. 2 is a block diagram showing a mesh discovery protocol.

A Mesh Discovery Protocol (MDP) defines extensions to the pre-defined 802.11 protocols necessary for general mesh node discovery and mesh network formation and dissolution. The mesh discovery protocol includes, but is not limited to, the following unique innovations related to mesh networking:

Mesh node discovery;
Mesh node association and disassociation;
Mesh node authentication;
Mesh node encryption;
Mesh node partitioning and merging;
Coordinated mesh and infrastructure support;
Wireless channel agility; and
Multi-layer integration FIG. 2 shows a wireless network 20 that includes a mesh network 22 and a mesh network 24. In this example, the mesh network 22 includes a mesh node A that connects through an Access Point (AP1) to a Wide Area Network (WAN) that may include a packet switched Internet network. The mesh nodes A and B in FIG. 2 are referred to generally below as mesh node 34 and can provide concurrent Access Point (AP) services and Station (STA) services during a discovery and authentication stage of MDP 28. The mesh nodes are alternatively referred to below as generic clients. Other mesh nodes 1 and 2 in mesh network 22 may wirelessly connect and communicate with each other, mesh node A, and the AP1. The mesh network 24 also includes a mesh node B that communicates with other mesh nodes 3 and 4. The connection between mesh node A and AP1 is standard 802.11 BSS. The connections between mesh node A and mesh node 1 and mesh node A and mesh node 2 are proprietary mesh connections. Similarly, the wireless connections between mesh node B and mesh node 3 and node B and mesh node 4 are proprietary mesh connections.

At some point, mesh node B in mesh network 22 may come into radio range of mesh node A in mesh network 22. After coming within radio range, it may be desirable for mesh node B to disassociate with mesh network 24 and re-associate with mesh network 22. For example, to mesh node B may wish to communicate over the WAN 26. However, mesh node B is currently prevented from communicating over WAN 26 because mesh network 24 does not include access through an AP.

Accordingly, mesh node B uses the Mesh Discovery Protocol (MDP) 28 to first discover the existence of mesh node A and information about mesh network 22. The MDP 28 is then used by mesh node B to associate with mesh network 22 and disassociate with mesh network 24. During the change in mesh association, the MDP 28 can also be used to authenticate and encrypt the link 32 between mesh node A and mesh node B. The automatically reconfigured mesh networks 22 and 24 created using MDP 28 are shown in FIG. 3.

Mesh Node Discovery

The mesh node 34, during the discovery stage, performs passive and active scanning as does an STA. During the discovery stage, the mesh node 34 is also ready to respond to an active scan and/or may send beacons as does an AP. This concurrent passive and active scanning behavior is not described in the IEEE 802.11 standard.

A generic client operation is described co-pending patent application Ser. No. 11/015,096, entitled: GENERIC CLIENT FOR COMMUNICATION DEVICES, filed Dec. 16, 2004 which is herein incorporated by reference. The generic client operation allows the mesh node 34 to use a same physical wireless interface to operate in more than one communication mode at the same time. For example, the generic client can operate in the BSS (Infrastructure), IBSS (ad-hoc), and/or W>DS modes at the same time using multiple different virtual interfaces that each operate through a same wireless physical interface.

This same generic client can be used to perform any concurrent AP service, STA service, and/or mesh node operation used during the MDP 28. Since a system for conducting concurrent AP and STA operations is described in the co-pending Generic Client patent application, it will not be described in any further detail. Of course, other techniques can also be used for providing the dual AP and STA service functionality for conducting MDP 28. For example, two wireless physical interfaces in the mesh node 34 can be configured to operate as an AP and a STA.

Individual peer-to-peer discovery of neighbor mesh nodes is provided by MDP 28 that does not require the group-based discovery methods defined by the 802.11 standard for infrastructure (BSS) or ad hoc (IBSS) modes. Existing neighbor mesh discovery schemes presently require the use of a Service Set IDentifier (SSID) in all communications between devices within a same mesh network. A common set of SSIDs are required to be configured in all of the devices that communicate in the same mesh network. This is a cumbersome process that is difficult to manage, does not scale well, and prevents dynamic free association of different mesh nodes.

Figure 1:
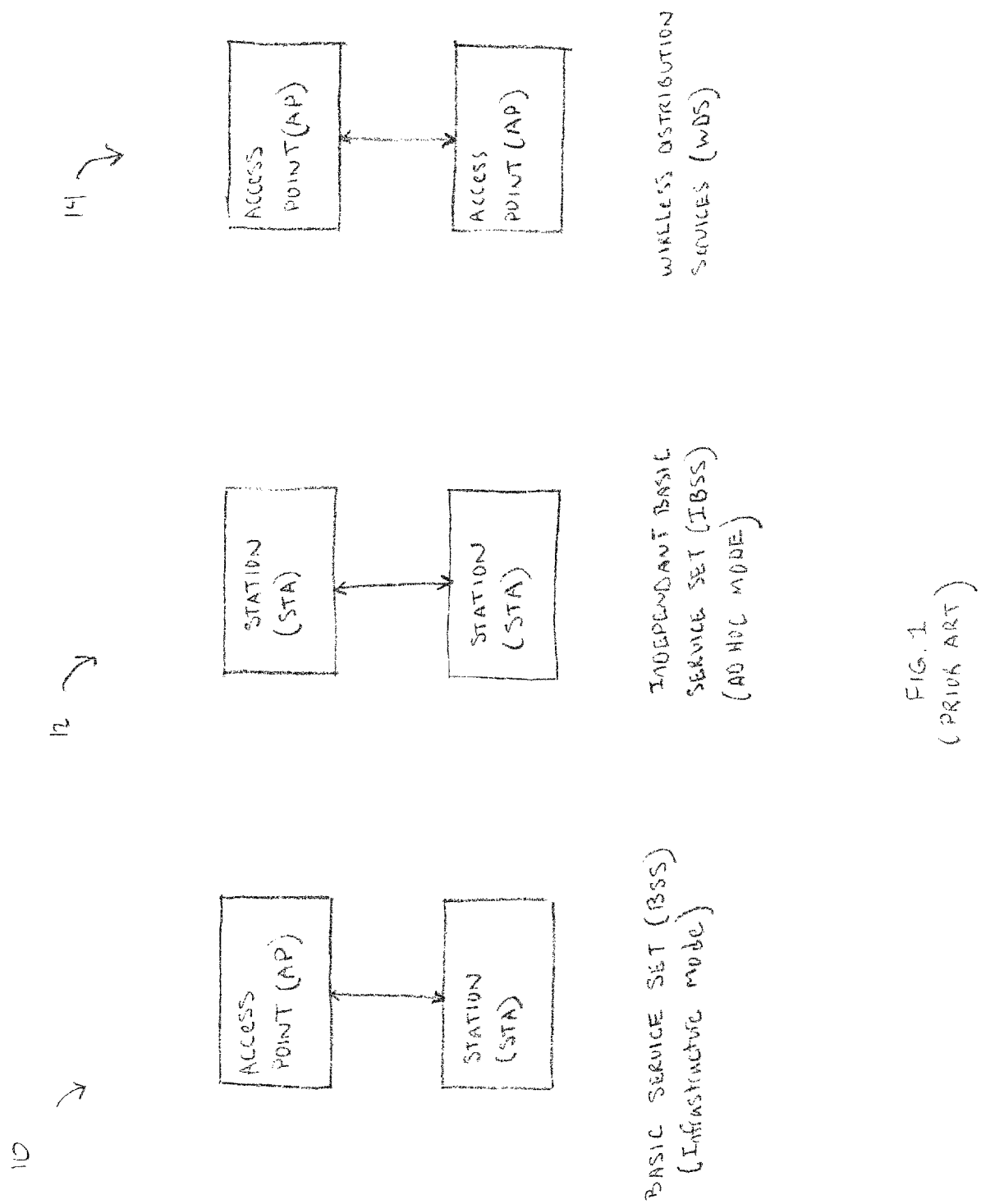
FIG. 1 is a block diagram showing prior art wireless communication modes.

Further, there is no network discovery or association protocol defined for the standard 802.11 WDS mechanism 14 (FIG. 1). The WDS links are configured manually by setting the peer MAC address. This is also error-prone, time-consuming, and not feasible for large-scale network deployments.

The mesh discovery protocol 28 addresses and resolves these current limitations by using Extensible Mesh Information Elements (EMIEs) 30 (FIG. 2) that convey information between nodes used for making mesh association decisions. An SSID-like identifier (or multiple such identifiers) may be used as a part of the Extensible Mesh Information Element to identify "mesh profiles" but is not required for operation of the mesh network. Such mesh profiles are distributed among mesh nodes in a mesh network by a reliable messaging scheme, such described in co-pending patent application Ser. No. 11/054,080, filed Feb. 8, 2005: entitled RELIABLE MESSAGE DISTRIBUTION IN AN AD HOC MESH NETWORK, which is herein incorporated by reference.

Mesh Node Association and Disassociation

Figure 4:
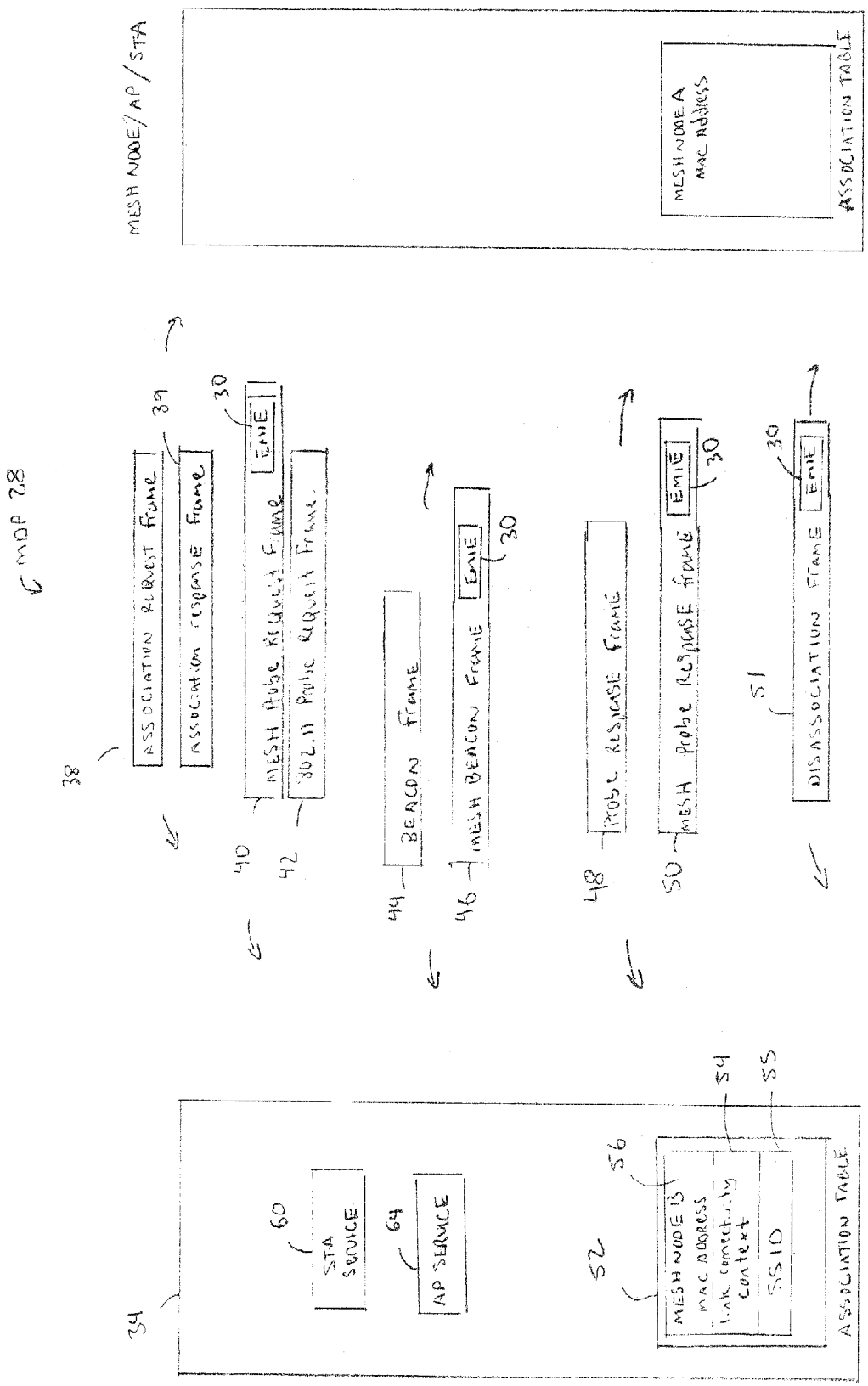
FIG. 4 is a diagram showing different 802.11 and mesh messages used in the mesh discovery protocol.

Referring to FIG. 4, mesh association is based on, but modified and improved over, the standard 802.11 STA to AP association protocol that uses standard Association Request and Association Response frames. Two mesh nodes 34 that have discovered each other via exchanging mesh probes 40 and 50 and/or mesh beacon 46, first negotiate the requisite roles of STA and AP in order to perform a mesh association. The mesh node 34 that represents the AP responds with an Association Response frame 50.

If the association is successful, both mesh nodes 34 create a link connectivity context 54 indexed with the peer mesh node's MAC address 56. This is different than the BSS 10 and IBSS 12 in FIG. 1, where the network-wide connectivity context is represented by the Basic Service Set IDentifier (BSSID). Advantageously, the MDP 28 does not require a mesh-wide BSSID, only link-specific connections. The ability to select a different role for each peer-to-peer association is unique to this mesh discovery protocol and also not suggested in the 802.11 standard. The use of the neighbor MAC address to track the particular association context works for both 3 address and 4 address frames.

A mesh disassociation frame 51 in one embodiment is a modification to a standard 802.11 disassociation management frame and used with extensions to identify the reason for mesh disassociation and can describe a new mesh network that may have been discovered. When the mesh node discovers a mesh network that it elects to connect with on a separate channel, it signals its existing associated neighbors with the disassociation frame. The neighbors are therefore notified of the existence of this new mesh network.

Mesh Partitioning and Mesh Merging

The peer-to-peer nature of MDP link management facilitates mesh partitioning and merging. The mesh discovery protocol 28 enables individual mesh nodes 34 to make independent decisions when associating with other mesh nodes 34 and when disassociating from mesh nodes. This is a fundamentally new way for a wireless device to operate autonomously in an 802.11 network. The 802.11 standard does not provide specific algorithms for nodes making such decisions.

Coordinated Mesh and Infrastructure Support

The mesh node 34 is also able to form a mesh network in the presence of standard 802.11 APs and STAs. The mesh discovery protocol 28 defines how the mesh nodes 34 connect to conventional APs, form a mesh network, and provide AP services to the standard 802.11 STAs. All of these activities can occur concurrently using the technique described in co-pending patent application Ser. No. 11/015,096, entitled: GENERIC CLIENT FOR COMMUNICATION DEVICES.

Wireless Channel Agility

A scanning algorithm used by the mesh discovery protocol 28 supports discovery on both a currently maintained link channel as well as alternate channels, even when connected to a mesh network. The scanning algorithm automatically adjusts when link connections are established and removed.

The scanning algorithm seeks to maintain reliable connections while at the same time supporting new mesh node and mesh network discovery. The scanning algorithm is defined for the cases of both single-channel wireless radios and multi-channel wireless radios that can tune to more than a single frequency band at the same time.

Multi-Layer Integration

The Extensible Mesh Information Element (EMIE) 30 referred to in FIG. 2 provides a unique mechanism to represent and communicate network capabilities including routing metrics (from layer 3), encryption algorithms, link bandwidth, or other application layer service parameters. This information is typically only available from the upper layer protocols and applications. Being able to access this information at the wireless MAC layer (layer 2) uniquely enables mesh nodes to make layer 2 decisions regarding optimal connection management. In other words, the mesh node 34 can make point-to-point connectivity decisions based on layer-3 forwarding or hop information in the EMIE 30. This will be described in more detail below.

Mesh MAC Service

Figure 5:
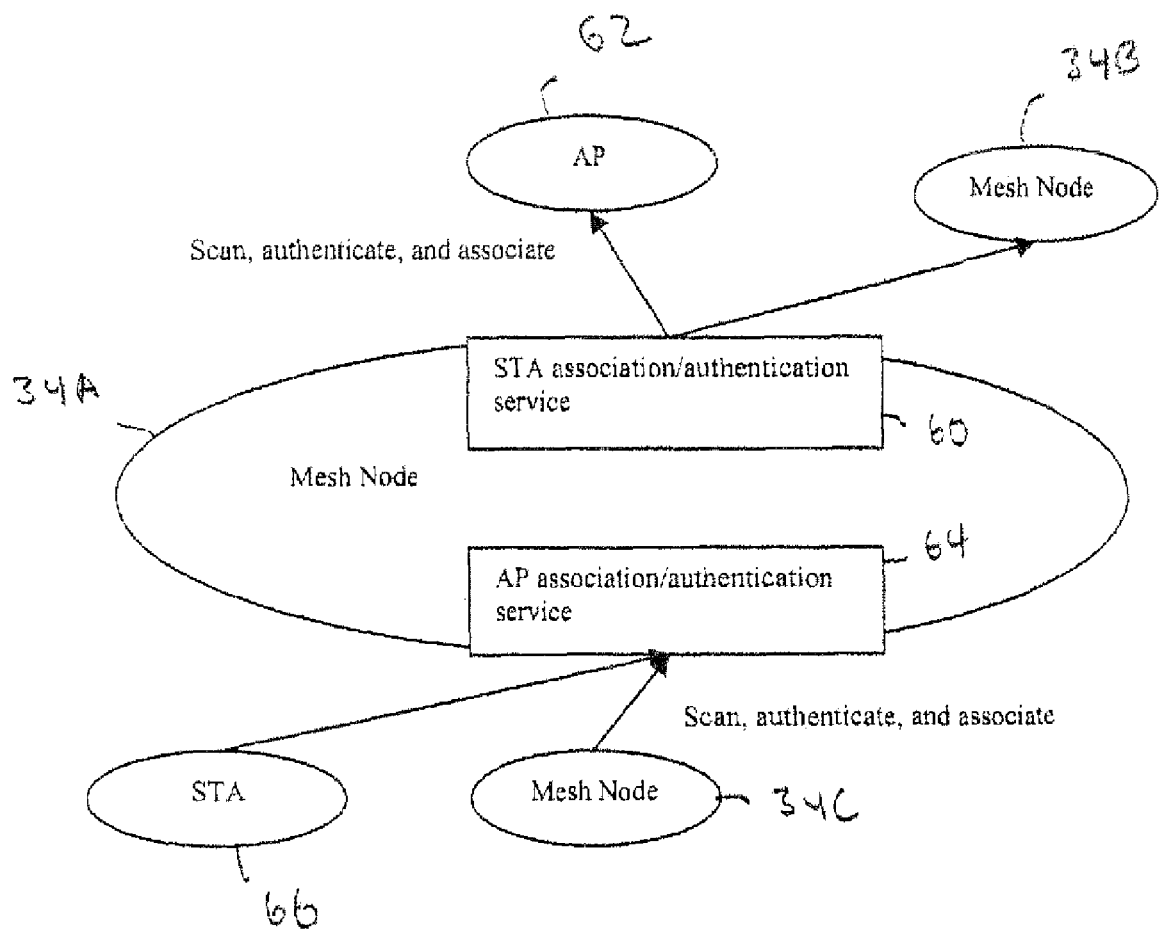
FIG. 5 shows how a mesh node operates as a Station service or an Access Point (AP) service.

Referring to FIGS. 4 and 5, in one embodiment, Media Access Control (MAC) services are used to support mesh networking. A mesh node 34 implements enhanced versions of the 802.11 station (STA) service 60 and access point (AP) service 64. The STA service 60 can discover and connect both to APs 62 and to other mesh nodes 34B. The AP service 64 can discover and associate with both other mesh nodes 34C and standard 802.11 STAs 66.

STA Service

The STA service 60 enables the mesh node 34A to scan (actively and passively) for both APs 62 and mesh nodes 34B and to authenticate and associate with them. Scanning and discovery behavior can depend on the presence and status of mesh node and infrastructure AP. Passive scanning by the STA service 60 is used to search for Beacon frames 44 (FIG. 4) from APs 62 or Mesh Beacon frames 46 from other mesh nodes 34B. If a Beacon frame 44 is received from an AP 62, then an infrastructure SSID 55 (FIG. 4) is used to perform the standard 802.11 association and authentication steps. If a Mesh Beacon frame 46 is received from a mesh node 34B, then a mesh association and authentication occurs.

Active scanning by the STA service 60 is performed by sending both 802.11 standard Probe Request frames 42 (FIG. 4) and Mesh Probe Request frames 40. If an infrastructure SSID 55 is identified in a received Probe Request frame 42, standard 802.11 authentication occurs followed by association with the AP 62. Alternatively, if a Mesh Probe Request frame 40 is received that contains an Extensible Mesh Information Element (EMIE) 30 (FIG. 1), the mesh parameters contained in the EMIE 30 are evaluated. If the mesh node is of interest, association and authentication occurs. The information contained in the EMIE 30 and the criteria for determining if that information initiates association and authentication with another mesh node 34 are described in more detail below.

Access Point (AP) Service

The AP service 64 in mesh node 34 enables standard 802.11 STAs 66 as well as other mesh nodes 34C to discover and associate to the mesh node 34A. The AP service 64 may be configured to send Beacon frames 44 and Mesh Beacon frames 46 (FIG. 4) to enable both standard 802.11 STAs and other mesh nodes 34C, respectively, to locate the AP service 64 by passive scanning.

Note the transmission of Beacon frames 44 and Mesh Beacon frames 46 may be suppressed for security reasons. To identify the AP service 64 when Beacon frames are suppressed, Probe Request frames 42 may be sent by 802.11 STAs 66 or Mesh Probe Requests frames 40 sent by mesh nodes 34C.

The AP service 64 responds to Probe Request frames 42 from standard 802.11 STAs 66 as well as Mesh Probe Request frames 40 from mesh nodes 34C. These types of requests occur when STAs 66 or mesh nodes 34C perform active scanning. The AP service 64 responds to STAs 66 with a Probe Response frame 48 or responses to mesh node 34C with Mesh Probe Response frame 50 indicating the capabilities of the mesh node 34A.

Association Table

The STA service 60 and the AP service 64 maintain an association context 54 in an association table 52 (FIG. 4) in order to manage the scanning and discovery algorithms. The authenticated link(s), whether infrastructure or mesh, are maintained within the context 54 indexed by the Transmitter Address (TA) 56. In one embodiment shown in FIG. 4, the transmitter address is a MAC address of the originator of the link.

The purpose of the association context 54 in association table 52 is to facilitate the 802.11i-based authentication and encryption key management, physical layer management (transmission power control), modulation rate, transmission and reception timing, power-save timing, and smart antenna (MIMO) management (beam steering and signal combining). The association table 52 may also keep track of connection statistics such as the number of frames sent, frames received, errors, and retransmissions. The association table 52 may be maintained in software. However, in order to take advantage of hardware-based encryption, it may be necessary to also program the encryption keys into hardware.

Mesh Frame Formats

Table 1 illustrates the 802.11 standard addressing field contents by wireless network type.

TABLE 1

802.11 Address Field Contents

| Network Type | To DS bit | From DS bit | Address 1 (A1) | Address 2 (A2) | Address 3 (A3) | Address 4 (A4) |
|---|---|---|---|---|---|---|
| IBSS (ad hoc) | 0 | 0 | DA | SA | BSSID | N/A |
| BSS (infrastructure), from AP to STA | 0 | 1 | DA | BSSID | SA | N/A |
| BSS (infrastructure), from STA to AP | 1 | 0 | BSSID | SA | DA | NA |
| WDS | 1 | 1 | RA | TA | DA | SA |

The address types are shown in Table 2. The various addresses are placed into the four address fields, A1 through A4, as appropriate.

TABLE 2

Address Types in Frames

| Address | Abbreviation | Description |
|---|---|---|
| Receiver Address | RA | The next address of the link (the next hop). |
| Transmitter Address | TA | The originating address of the particular link (the particular hop in the chain). |
| Destination Address | DA | The final destination address for the data frame. |
| Sender Address | SA | The originating address of the data frame. |

IBSS and BSS frames are 3-address frames, while WDS frames are 4-address frames. This enables layer 2 forwarding to occur with WDS frames, where frames traverse multiple links to reach the final destination. Whenever a WDS frame is sent between immediate neighbors, RA=DA and TA=SA.

Table 3 defines the fields in the WDS header:

TABLE 3

WDS Header

| 2 | 2 | 6 | 6 | 6 | 2 | 6 | 0-2312 | 4 |
|---|---|---|---|---|---|---|---|---|
| Frame control | Duration/Id | A1 | A2 | A3 | Sequence Control | A4 | Body | FCS |
| | | | Mac Header | | | | | |

Mesh Addressing

For mesh nodes to communicate with each other, certain assumptions may be made regarding the address field settings for various frames. Unicast mesh frames can set A1 to the destination address (DA). Since there is no BSSID required for a mesh network, the A3 may be set to the DA, or to meaningless data. Multicast frames can set A1 to the multicast group (DA) address. Again, A3 is unnecessary since there is no BSSID in the mesh, but it is set to the multicast group address or to meaningless data.

Mesh Frame Filtering

The STA service 60 and the AP service 64 can perform filtering of traffic from nodes that are not of interest. Filtering in a standard 802.11 network is performed by BSSID, which is included in standard IBSS or BSS frames. For a mesh network, however, there is no need to perform an IBSS "join" or use the MAC address of an AP as a mesh-wide parameter.

Since there is no BSSID required or relevant for a mesh network, filtering instead may be performed as follows:

Unicast Frames: Recipients filter by the contents of A1.

Multicast Frames: Recipients filter by the contents of A2, except for management frame types needed for mesh discovery.

Probe Requests or Beacons: Recipients do not filter Mesh Probe Requests or Mesh Beacons. In Mesh Probe Requests and Mesh Beacons, A1 and A3 are set to a group multicast address because there is no BSSID in the mesh and need to be received and processed by all mesh nodes in order to support mesh discovery.

Format of Individual Frame Types

Figure 6:
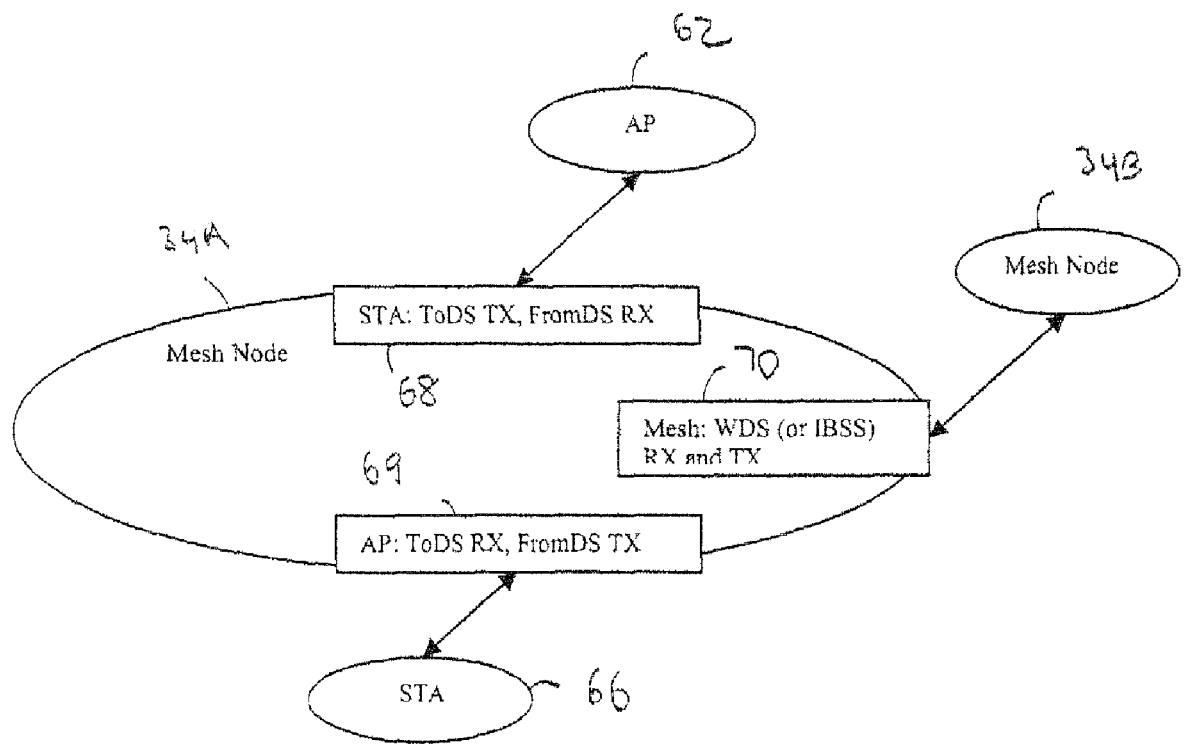
FIG. 6 shows how different data frames are used by a mesh node for different destinations.

Referring to FIG. 6, mesh management frames set ToDS and FromDS to 0. Mesh data frames set ToDS and FromDS to 0 if 3-address frames (IBSS) are used or to 1 if 4-address frames (WDS) are used.

Data Frames

Mesh node 34A may use different data frames depending on the destination. Data frames 68 and 69 sent to and from APs 62 and STAs 66, respectively, take the standard 802.11 format of ToDS or FromDS 3-address BSS frames. This enables full compatibility and interoperability between mesh node 34A and non-mesh 802.11 APs 62 and STAs 66.

Data frames 70 sent between mesh node 34A and mesh node 34B can be sent either as 4-address WDS frames or 3-address IBSS frames. The choice depends on convenience of implementation (e.g., based on hardware limitations), and either is possible. The preferred choice is to use WDS frames for data traffic within the mesh. Using WDS frames has the advantage of enabling layer 2 forwarding.

Management Frames

Management frames for 802.11 networks are defined in section 7 of ANSI/IEEE Std 802.11-1999, IEEE Standard for Information Technology, Part 11: Wireless LAN Medium Access Control (MAC) and Physical Layer (PHY) specifications which is herein incorporated by reference.

Management frames for the mesh network can be implemented in different ways. Pre-existing 802.11 management frames can be modified. Another option creates new 802.11 management frames using the frame type and subtype of "proprietary (reserved)" as defined in Table 1 of the 802.11 IEEE standard referred to above. Another option sends management information in the body of mesh data frames. For explanation purposes, management messages sent within the body of 802.11 frames will still be referred to as mesh "management frames". In one embodiment, as in standard 802.11 management frames, mesh management frames might not be acknowledged.

Beacon Frame

As shown in FIGS. 4 and 5, Beacon frame 44 and Mesh Beacon frame 46 are sent by the AP service 64 of a mesh node 34, if configured. Beacon frame 44 or Mesh Beacon frame 46 enable passive scanning by other standard 802.11 STAs 66 or mesh nodes 34C, respectively.

Association Request/Response Frames

The AP service 64 handles an Association Request frame 38 from a standard 802.11 STA 66 according to the 802.11 standard. The AP service 64 also handles an Association Request frame 38 from a mesh node to form an association. The AP service 64 responds to an Association Request 38 from a standard 802.11 STA 66 or a mesh node 34C with an Association Response frame 39, according to the 802.11 standard.

Probe Request Frame

A standard 802.11 Probe Request frame 42 from a STA 66 contains the SSID and a list of supported rates. If there is an SSID match, the AP receiving the frame replies to the request with a Probe Response frame 48. The mesh discovery protocol 28 uses a Mesh Probe Request frame 40 that contains an indication that the mesh node 34 is seeking another mesh node in order to form a mesh network. This is not available within the standard 802.11 Probe Request frame 42.

Several different embodiments of the Mesh Probe Request frame 40 are possible. In one embodiment, the 802.11 standard Probe Request frame 42 is extended to incorporate additional information. In another embodiment, the SSID information element in the 802.11 standard Probe Request frame 42 is overloaded to communicate mesh information. Alternatively, a separate, new Mesh Probe Request frame 40 is defined or the Mesh Probe Request information can be sent in the body of a mesh data frame. While all four of these options are functional solutions, the last embodiment may operate better in avoiding conflict with the pre-defined 802.11 standard management frames.

Either way, the Mesh Probe Request frame 40 contains the new Extensible Mesh Information Element (EMIE) 30 (FIG. 2) in addition to any expected SSID information element and the list of supported rates. The Mesh Probe Request frame 40 is sent as a part of the active scanning algorithm by mesh nodes 34, in addition to the standard 802.11 Probe Request frames 42.

Probe Response Frame

The AP service 64 also responds to Probe Request frames with Probe Response frames 48 or 50 in the event of active scans by other mesh nodes 34 or standard 802.11 STAs 66. The AP service 64 looks for SSID(s) and/or Extended Mesh Information Elements 30 (FIG. 1) within any received management frames. If the AP service 64 finds the Extensible Mesh Information Element 30, it performs a negotiation with the discovered mesh node to first determine if an association will be established, and if so, the peer mesh nodes will negotiate which will operate as a supplicant and which will operate as an authenticator during an authentication.

In one embodiment, a randomly generated token is exchanged between the peer mesh nodes 34 to determine which will operate as the STA and which will operate as the AP in the association and subsequent authentication exchange. This will be described in more detail below. This allows mesh nodes 34 to take either the role of STA or AP on a per-link basis.

Disassociation Frame

The Disassociation frame 51 is used to carry notifications when a mesh node 34 makes the decision to leave the mesh network for any reason. The Disassociation frame 51 is unicast or multicast to a single associated mesh node 34 or a group of associated mesh nodes 34. A standard 802.11 Disassociation frame can be used with certain modifications.

The Destination Address (DA) is typically set to the MAC address of the associated mesh node 34. In the case where there are multiple mesh associations, it would not be efficient to unicast the Disassociation frame 51 to all of the associated mesh nodes 34, so a multicast group address is used. The reason code is set according to defined values in Table 18 of the IEEE 802.11 standard. The body of the Disassociation frame 51 may contain the EMIE 30 to communicate further information. For example, if the mesh node 34 is disassociating in order to associate to a different mesh node 34 (or mesh nodes) on an alternate channel, the contents of the Extensible Mesh Information Element 30 may be set to convey this information.

Extensible Mesh Information Element

The Mesh Beacon frame 46, Mesh Probe Request frame 40, and Mesh Probe Response frame 50 all use the Extensible Mesh Information Element 30 within the body of the frame. The Extensible Mesh Information Element 30 can be encoded the same way as the variable length 802.11 information elements as described in section 7.3.2 of IEEE 802.11 standard. These are TLV (type, length, value) elements where the first octet is the element ID, the second octet is the length, and the rest is a variable length body containing the information field.

A message type is encoded via this format as well. A management message will contain at least one information element, the message type, which can be used as a simple "keep alive" for a link connection. Usually there will be some sort of information in addition to the message type. The length of the Extensible Mesh Information Element 30 is variable. A sample Extensible Mesh Information Element is shown in Table 4:

TABLE 4

Extensible Mesh Information Element

| Variable | Description | Syntax | Source |
| --- | --- | --- | --- |
| ElementVersion | The version number of the Extensible Mesh Information Element | 2 bits: 0-3 | Revised if EMIE format changes |
| AssociationCounter | The number of directly connected peer mesh nodes | 6 bits: 0-63 Scope: Local Sort: Low to High | Association table |
| MeshCounter | The number of nodes in a locally connected wireless mesh (with no intervening wired links) | 8 bits: 0-255 Scope: Global Sort: High to Low | Upper layer management application |
| HopCounter | The number of wireless hops between the mesh node and the mesh node associated to the nearest AP (a.k.a., the nearest gateway mesh node) | 4 bits: 0-15 Scope: Global Sort: Low to High | Upper layer management application |
| APCounter | The number of APs associated to mesh nodes in the wireless mesh | 4 bits: 0-15 Scope: Global Sort: High to Low | Upper layer management application |

Scanning and association schemes used with the mesh discovery protocol 28 will now be described in more detail. The effectiveness of these schemes can determine the efficiency of the overall performance of a mesh network.

Scanning

A mesh node 34 scans in order to discover other mesh nodes. Scanning can be performed passively or actively. Passive scanning involves listening for Mesh Beacon frames 46 (FIG. 4). Active scanning involves sending Mesh Probe Request frames 40 and listening for Mesh Probe Response frames 50. Active scanning may be more efficient because the dwell time on a particular channel is predictable and is determined by the time interval between sending of the Mesh Probe Request frame 40 and the reception of the Mesh Probe Response frame 50.

The active and passive scanning schemes that may be used for the various scenarios are described in Table 5.

TABLE 5

Different possible combinations for whether a mesh node has an association with an infrastructure access point and/or other mesh nodes.

| Use Case | Infrastructure Association | Mesh Association(s) |
|---|---|---|
| Case 1: Isolated mesh node | No | No |
| Case 2: Mesh node with only AP association | Yes | No |
| Case 3: Mesh node with only mesh association(s) | No | Yes |
| Case 4: Mesh node with both AP and mesh node associations | Yes | Yes |

Case 1: Isolated Mesh Node

When a mesh node is isolated and has no associations with either APs or other mesh nodes, the primary objectives are to find an AP on any channel, find a mesh node or nodes on any channel, or scan aggressively (passive and active) on all configured channels. Note that "configured channels" refer to all or a subset of possible wireless channels that may be defined for a particular mesh network. For example, a given mesh network might be configured only to use channels 1, 6, and 11 in the 802.11b set of channels. This would increase efficiency at the cost of reduced flexibility. Any combination of channels across any set of wireless bands may be configured for a mesh network. To achieve these objectives and referring to FIG. 4, the following technique may be used.
 1. A scan is initiated every "short scan interval" which defaults to every one minute.
 2. The mesh node 34 scans on all configured channels in sequence (lowest to highest).
 3. Both 802.11 Probe Request frames 42 and Mesh Probe Request frames 40 are sent on each channel.
 4. The mesh node 34 waits for a "dwell time" on each channel to get responses. The mesh node 34 listens for Probe Response frames 48, Mesh Probe Response frames 50, Beacon frames 44, and Mesh Beacon frames 46. This constitutes both active and passive scanning.
 5. After all channels are scanned, the results are evaluated using a mesh association operation described in more detail below in order to make a decision about which association to pursue.

Figure 7:
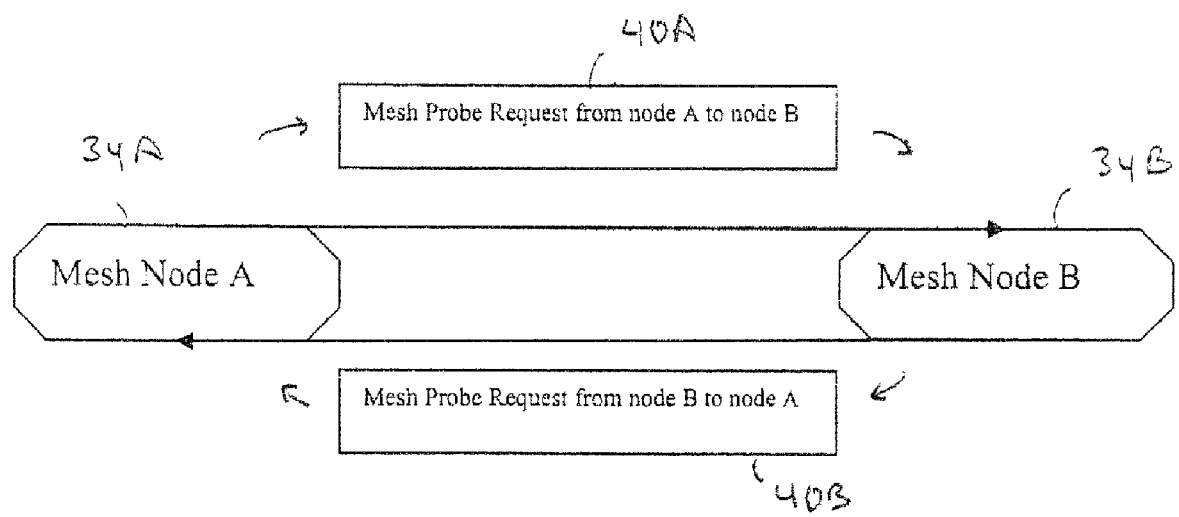
FIG. 7 shows how two mesh nodes discover each other via active scanning.

For example, FIG. 7 shows a scenario where two isolated mesh nodes A and B, discover each other via active scanning using Mesh Probe Request frames 40A and 40B.

Case 2: Mesh Node with Only AP Association

When a mesh node 34 has an AP association with infrastructure, the objectives may be to maintain the AP association, find mesh nodes on the current channel, and scan passively on the current channel. To achieve these objectives, and referring again to FIG. 4, the following technique may be used.
 1. A scan is initiated every "short scan interval" which defaults to every one minute.
 2. The mesh node scans only on the current channel. Other channels than the current channel will not be scanned until such time as the AP association is lost. This is in order to preserve the AP association.
 3. Only Mesh Probe Request frames 40 are sent since the mesh node 34 already has an AP association. Thus, 802.11 Probe Request frames 42 do not need to be sent.
 4. The mesh node 34 listens for Mesh Probe Response frames 50. This is active and passive scanning, but only on the current channel.
 5. If one or more Mesh Probe Response frames 50 are received, the results are evaluated during the association process described below in order to make a decision about which association to pursue.

Case 3: Mesh Node with Only Mesh Association(s)

When a mesh node 34 has one or more mesh node association(s) but no AP association, the objectives may be to maintain the mesh associations), find an AP on any channel, find a mesh node or nodes on any channel, and scan intermittently on successive channels. To achieve these objectives, and referring to FIG. 4, the following operations are performed.
 1. A scan is initiated every "medium scan interval" which defaults to every two minutes.
 2. The mesh node 34 scans initially on the current channel. Then, the mesh node 34 scans on another channel selected from the list of all configured channels in sequence (lowest to highest). After scanning on one other channel, the mesh node 34 returns to the current channel. In this way, the impact to the mesh associations) on the current channel is minimized, because the mesh node does not scan all configured channels in one pass.
 3. Both 802.11 Probe Request frames 42 and Mesh Probe Request frames 40 are sent on each channel.
 4. The mesh node 34 waits a "dwell time" on each channel to get responses. The mesh node 34 listens for a Probe Response frame 48, Mesh Probe Response frame 50, Beacon frame 44, or Mesh Beacon frame 46. Thus, this constitutes both active and passive scanning.
 5. If one or more Mesh Probe Response frames 50 are received, the results are evaluated during a mesh association in order to make a decision about which association to pursue.

Figure 8:
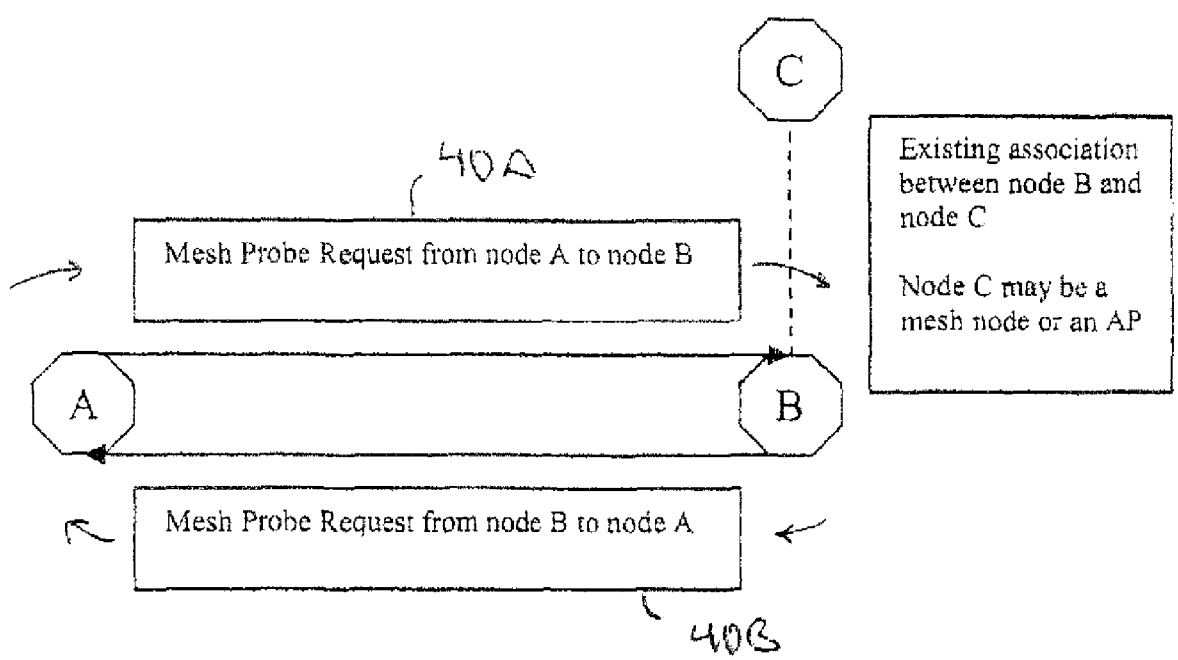
FIG. 8 shows how mesh nodes discover each other when one of the mesh nodes is currently connected to another node.

For an example, FIG. 8 shows a scenario where two nodes C and B are associated. Node B is connected but continues to scan at a reduced rate. In this example, node C may be a mesh node or an AP. Node A and node B discover each other via active scanning by either mesh node A sending Mesh Probe Request frame 40A and/or mesh node B sending Mesh Probe Request frame 40B. In this example, mesh node B subsequently identifies and associates with mesh node A.

Case 4: Mesh Node with Both AP and Mesh Node Associations

When a mesh node 34 has both AP and mesh node associations, the objectives may be to maintain the AP and mesh node associations, find other mesh nodes on the current channel, and scan passively on the current channel. To achieve these objectives, and referring to FIG. 4, the following operations may be performed.
 1. A scan is initiated every "short scan interval" which may default to some periodic time interval.
 2. The mesh node 34 scans only on the current channel. Other channels than the current channel will not be scanned until such time as the AP association is lost. This is in order to preserve the AP association.
 3. Only Mesh Probe Request frames 40 are sent. This is because the mesh node already has an AP association, so 802.11 Probe Request frames 42 do not need to be sent.
 4. The mesh node 34 listens for Mesh Probe Response frames 50. This is active and passive scanning, but only on the current channel.

5. If one or more Mesh Probe Response frames 50 are received, the results are evaluated during the mesh association operation in order to make a decision about which association to pursue.

Figure 9:
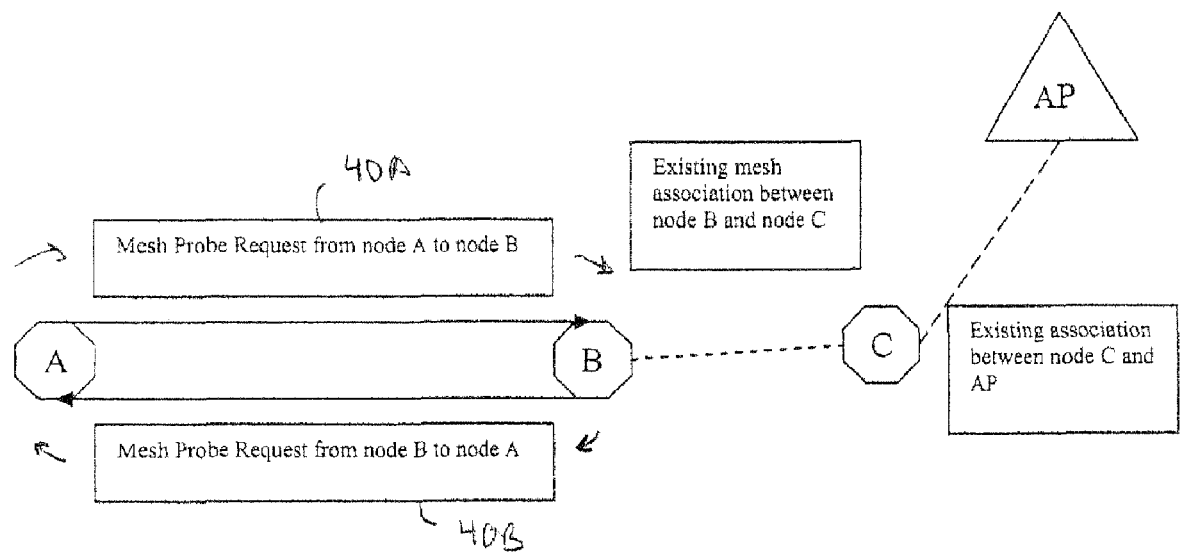
FIG. 9 shows a node discovery for two nodes in mesh association.

For an example, FIG. 9 shows a scenario where mesh node C is associated to an AP and is also in a mesh association with another mesh node B. Then, mesh node B subsequently identifies and associates with mesh node A. Mesh node A discovers mesh node B as a result of active scanning where mesh node A sends Mesh Probe Request frame 40A or mesh node B sends Mesh Probe Request frame 40B.

Arbitrating Overlapping Scans

Unassociated mesh nodes 34 scan the network independently for mesh peers. It is likely that Mesh Probe Request frames 40 will be exchanged within a short time of each other. Once the peer mesh nodes 34 process the parameters in the received Extensible Mesh Information Elements 30, they may start an association exchange. However, in one embodiment, the association exchange is not symmetric: one side needs to send an Association Request frame 38 and the other mesh node needs to send back an Association Response frame 39 (FIG. 4).

Figure 10:
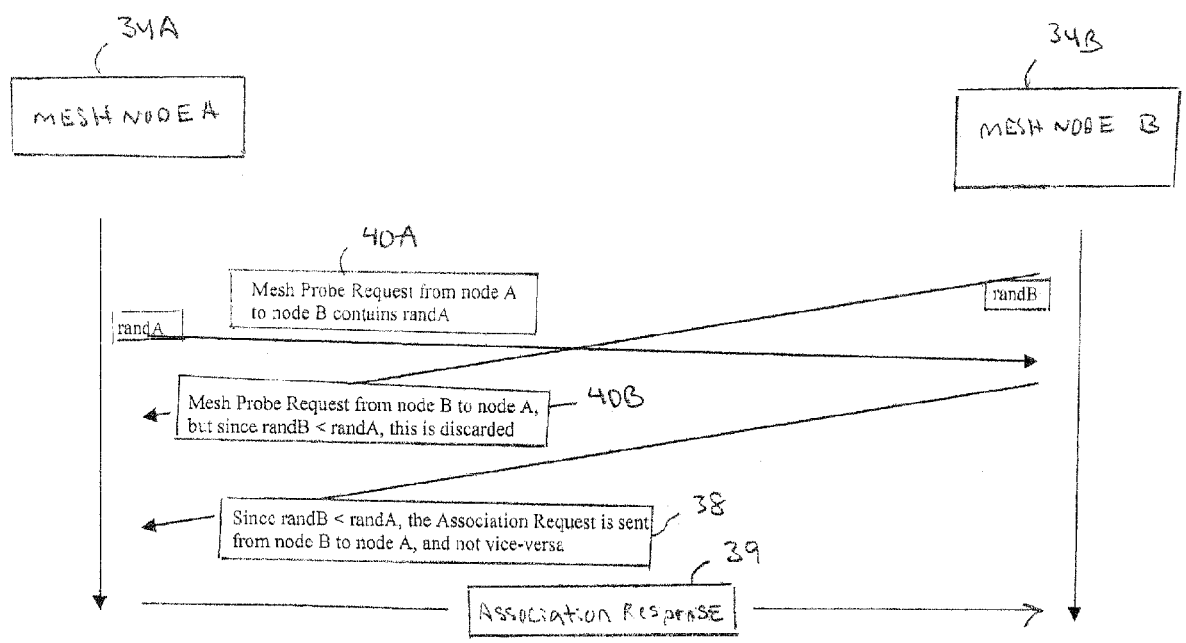
FIG. 10 is a diagram showing how two nodes arbitrate overlapping scans.

FIG. 10 shows an example of use of an arbitration process that can be used to address the potential for overlapping requests 38 from the peer mesh nodes 34.

1. Mesh nodes A and B actively scan to find other mesh nodes. In this example, it is assumed mesh nodes A and B encounter each other on the same channel.
2. Pseudo-random tokens randA and randB are generated by mesh nodes A and B, respectively. To improve performance and reduce computational load, this can be a seed that is generated less frequently and modified with a predefined mask.
3. The tokens randA and randB are stored on the respective transmitter mesh nodes A and B and are included in the Mesh Probe Request frames 40A and 40B, sent by mesh nodes A and B, respectively.
4. Upon receipt of a Mesh Probe Request 40, the receiving mesh node compares the token value (randx) received with its own, locally generated token. If the local token value is less than the received token value, then the receiving mesh node takes the role of a STA (supplicant) in the exchange, and sends the Association Request frame 38. Alternatively, if the local token value is greater than the received token value, then the mesh node takes the role of an AP (authenticator) and waits for the other mesh node to send the Association Request frame 38. The mesh node receiving the association request frame 38 then responds with an Association Response frame 39.
5. The remainder of the association exchange proceeds with these selected roles.

Some of these features are just examples and may or may not be used in different implementations.

In the example shown in FIG. 10, Node A sends a Mesh Probe Request frame 40A containing randA and mesh Node B sends a Mesh Probe Request frame 40B containing randb. In this example, randB<randA, so mesh node A discards the Mesh Probe Request frame 40B from mesh node B. Mesh node B then sends an Association Request frame 38 and mesh node A responds with an Association Response frame 39.

An arbitration technique is described in IEEE Std 802.11i-2004, IEEE Standard for Information Technology, Part 11: Wireless LAN Medium Access Control (MAC) and Physical Layer (PHY) specifications, Amendment 6: Medium Access Control (MAC) Security Enhancements. This technique uses the MAC address of the respective mesh nodes. The higher address would be the authenticator (AP) and the lower address the supplicant (STA). However, this could cause some mesh nodes to be APs or STAs more often. The arbitration described above is better at randomizing the roles in order to spread the overhead among all the mesh nodes.

Mesh Association Decision Scheme

The Extensible Mesh Information Element 30 is used to communicate information that facilitates the association decision when multiple mesh nodes and/or APs are discovered on alternate channels. This is important for wireless radios that can tune to only a single channel at a time. Obviously, for wireless radios that can tune to two or more channels, multiple associations can be pursued, up to the number of channels that can be utilized by the wireless radio. Still, a decision may need to be made to select a subset of associations to pursue if the available number of associations on different channels exceeds the wireless radio's capabilities. The same mesh association decision scheme could also be applied to the nodes supporting multiple channels at the same time.

As described above in Table, a number of variables are provided by the Extensible Mesh Information Element to assist with the association decision.

TABLE 6

Priorities and descriptions of the variables in the Extensible Mesh Information Element.

| Variable | Description | Priority | Explanation |
| --- | --- | --- | --- |
| APCounter | The number of APs associated to mesh nodes in the wireless mesh | #1 Higher value is better | Strongly prefer to join a mesh with a connection to infrastructure APs (and hence to Internet). |
| HopCounter | The number of wireless hops between the peer and the mesh node associated to the nearest AP (a.k.a., the nearest gateway mesh node) | #2 Lower value is better | Prefer to minimize number of hops to reach the AP, if there is one. |
| MeshCounter | The number of nodes in a locally connected wireless mesh (with no intervening wired links) | #3 Higher value is better | Prefer to maximize the size of the mesh to join, if all else is equal. |
| AssociationCounter | The number of directly connected peer mesh nodes | #4 Lower value is better | Prefer to minimize the number of direct neighbors to avoid congestion, if all else is equal. |

As described in Table 6, one embodiment gives priority to nodes with higher APCounter, lower HopCounter, higher MeshCounter, and lower AssociationCounter values in that priority. The APCounter may be given the most weight because it indicates the number of connections to APs and hence to the Internet, which is likely to be important for users of a mesh network to reach external resources. In this example, the HopCounter has second weighting because the number of hops to reach the AP has direct influence on the performance of the connection to the Internet. The MeshCounter has third weighting because the overall objective of a mesh network is to find other mesh nodes and form a larger mesh network. The AssociationCounter has least weighting, but is still important because a mesh node with fewer direct connections will be less busy and more available for the user.

It should be apparent that these parameters can be modified and the relative priorities changed by upper-layer management applications that process the Extensible Mesh Information Element 30 data to make the final decision as to which channel(s) to switch to, and which mesh node(s) to associate with. Once the mesh association decision scheme has been completed, the preferred choice is then used to initiate the association sequence.

Multi-layers of the Open System Interconnect (OSI) model are associated with the different information shown in Table 6. For example, the APCounter is associated with a layer-2 connectivity associated with an AP node. The HopCounter variable is associated with a layer-3 forwarding or the number of hops associated with different distances between AP and mesh nodes. The EMIE 30 and table 6 are also used in combination physical layer-1 considerations as described by the different channel scanning operations in FIGS. 7, 8 and 9. Other policy considerations, such as particular SSID values, may also be considered or override these other layer-1, -2 or -3, priorities. Thus, scanning, discovery, and association decisions in the MDP 28 can be based on both physical layer-1 wireless channels, layer-2 addressing and connectivity, layer-3 forwarding and routing, and/or other policy considerations.

Example Association

Assume that three peer mesh nodes are discovered. They are represented as follows:

| Node number | APCounter | HopCounter | MeshCounter | AssociationCounter |
|---|---|---|---|---|
| Node 1: | | | | |
| 1 | 1 | 3 | 10 | 3 |
| Node 2: | | | | |
| 2 | 2 | 6 | 20 | 2 |
| Node 3: | | | | |
| 3 | 0 | 0 | 50 | 4 |

| Rank | Node Number | APCounter | HopCounter | MeshCounter | AssociationCounter |
|---|---|---|---|---|---|
| If the elements are sorted by the APCounter (higher value is better): | | | | | |
| 1 | 2 | 2 | 6 | 20 | 2 |
| 2 | 1 | 1 | 3 | 10 | 3 |
| 3 | 3 | 0 | 0 | 50 | 4 |
| If the elements are sorted by the HopCounter (lower value is better, unless value is 0): | | | | | |
| 1 | 1 | 1 | 3 | 10 | 3 |
| 2 | 2 | 2 | 6 | 20 | 2 |
| 3 | 3 | 0 | 0 | 50 | 4 |
| If the elements are sorted by the by the MeshCounter (higher value is better): | | | | | |
| 1 | 3 | 0 | 0 | 50 | 4 |
| 2 | 2 | 2 | 6 | 20 | 2 |
| 3 | 1 | 1 | 3 | 10 | 3 |
| If the elements are sorted by the AssociationCounter (lower value is better): | | | | | |
| 1 | 2 | 2 | 6 | 20 | 2 |
| 2 | 1 | 1 | 3 | 10 | 3 |
| 3 | 3 | 0 | 0 | 50 | 4 |

For this example, only the first sort would be sufficient, because the APCounter would select a clear choice: mesh node 2. This is because mesh node 2 provides connectivity to the largest number of APs, even though it takes more hops to reach one of those APs and the mesh size itself is not the largest available. If subsequent sorting was necessary, or if the priorities were modified by the upper-layer management application, then the successive sorts would be applied to reach a decision.

Disassociation

Mesh nodes 34 may disconnect from peers for a number of reasons, including powering down, conserving resources, changing authentication profile, or changing operating channel. Whenever possible, the mesh node 34 initiating the action that results in the link being disconnected sends a Disassociation frame 51 (FIG. 4).

The Disassociation frame 51 may be a mesh management frame based on the standard 802.11 Disassociation frame. The frame 51 can be unicast or multicast. In one embodiment, it is primarily multicast. The body of the Disassociation frame 51 contains the Extensible Mesh Information Element. The Extensible Mesh Information Element 30 is used to communicate the reason for the disassociation and provide useful information to the neighbor mesh nodes.

For example, when a mesh node 34 in a connected mesh finds an AP on a different channel, it may switch to that channel. As a result, the mesh node 34 loses connection to the mesh network. The mesh node 34 can include the destination channel in the Extensible Mesh Information Element 30 that it sends in the Disassociation frame 51 to its mesh neighbors, in addition to the AP's SSID, BSSID, and other AP management information. These parameters aid the rest of the mesh in formulating a decision whether to follow the disassociating mesh node 34 and reform the mesh on the new channel or not.

Implementation Details

A wireless protocol driver implements the Extensible Mesh Information Element 30 in the discovery messages (Mesh Beacons, Mesh Probe Requests and Mesh Probe Responses). A wireless protocol driver also implements the association logic to rank the mesh nodes as described in the above example. An API and a higher-layer management application can enable configuration for the preferences.

The algorithm may include variables other than the ones carried within the Extensible Mesh Information Element. For example, another such variable is the standard 802.11 SSID. This could enable the SSID to be used in making decisions as to which mesh network a mesh node would join. For example, there could be "allowed SSIDs" and "forbidden SSIDs." In this way, the Extensible Mesh Information Element 30 can be extended with other variables to make application-specific decisions.

API Implementation Details

The API is via the OID_PHOP_DISCOVERY and OID_PHOP_IE objects. The OID_PHOP_DISCOVERY object can be set or queried. The associated structures can be:

```
#define MAX_DISCOVER 5
typedef enum_DISCOVER
{
    Associations = 1,
    Mesh = 2,
    Hops = 3,
    APs = 4,
    SSID = 5
} DISCOVER, *PDISCOVER;
typedef struct_DISCOVER_SET
{
    DISCOVER    set[MAX_DISCOVER];
} DISCOVER_SET, *PDISCOVER_SET;
```

The set or query contains an ordered set of DISCOVER elements. The association decision scheme can use the order of the elements to determine the relative weight, first to last. The upper-layer management application can reorder the position of the DISCOVER variables within the list to change the priority settings.

The OID_PHOP_IE object can be set or queried. The associated structure may be:

```
typedef struct_MESH_IE
{
    USHORT  Version;      // IE version 0-3 (Q)
    USHORT  AssocCount;   // number of L2 neighbors 0-63 (Q)
    USHORT  MeshCount;    // number of nodes in mesh 0-255 (Q,S)
    USHORT  HopCount;     // number of L2 hops to nearest
                          gateway 0-15 (Q,S)
    USHORT  APCount;      // number of APs in mesh 0-15 (Q,S)
} MESH_IE, *PMESH_IE;
```

Of these parameters, some can be queried, and others can be both queried and set as described below. The version might only be queried. It allows additional members to be added to the Extensible Mesh Information Element 30 in the future. The AssocCount may only be queried. It indicates the number of directly associated peers. The MeshCount, HopCount, and APCount can be set or queried. They may not be set by the driver and might only be used to communicate information to other peers during the mesh discovery protocol exchange.

Mesh Node Authentication and Encryption

The wireless mesh infrastructure requires authentication of mesh nodes and secure transport of data between nodes. A mesh node accordingly operates in several distinct modes including an Infrastructure Station Mode (STA), Mesh Mode (MESH), and Infrastructure Access Point (AP) mode. Following successful discovery, authentication can be based on the standard 802.11i for IBSS mode but with the extension that the roles of the previously negotiated AP and STA are retained and extended into the roles of 802.1x [8021x] authenticator and supplicant, respectively. Encryption can also be based on the 802.11i IBSS mode, with each mesh node managing its own set of peer-to-peer unicast keys and group (multicast) encryption keys. This will be described in more detail below.

These extensions are useful optimizations not anticipated by the 802.11 standard and address fundamental security deficiencies that currently exist in the 802.11 standard. For example, there is currently no built-in link level (layer 2) authentication in an IBSS. A node that receives an IBSS beacon will trust the information in the beacon and attempt to join the network, tune to that channel, adopt the BSSID, and start sending data frames. This allows an intruder node to send a beacon to a target mesh node and cause it to leave the mesh. The intruder node can manipulate the Timing Synchronization Function (TSF) value to fool the target node. Likewise, in WDS, there is no link authentication.

The application of 802.1x protocols [8021x], as described in IEEE Std 802.1X-2001, IEEE Standard for Local and Metropolitan Area Networks—Port-Based Network Access Control, to this environment tailors the authentication protocols such that concurrent authentication of all three modes can be simultaneously active on a same wireless interface.

Dynamic STA, AP, and Mesh Configuration During Authentication

Figure 11:
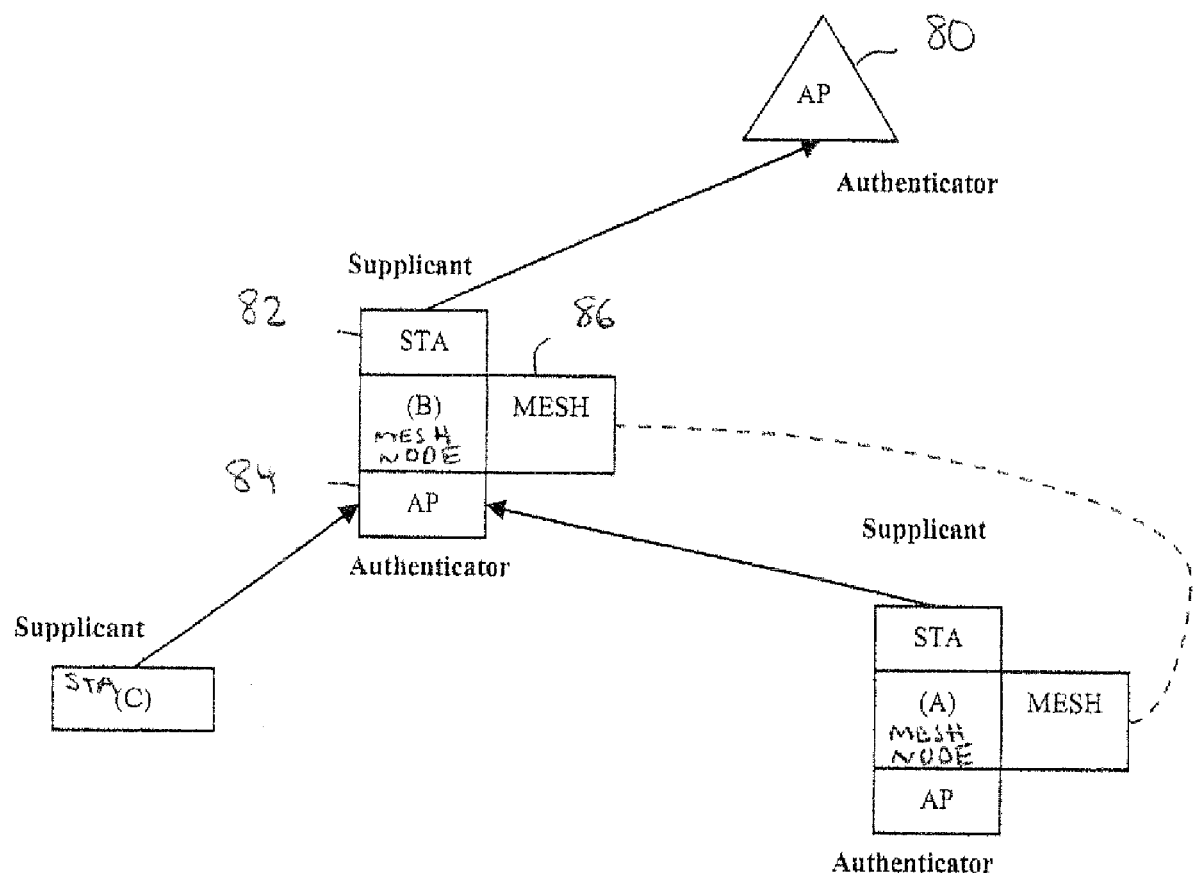
FIG. 11 is a block diagram showing how a mesh node operates as both a supplicant and an authenticator.

FIG. 11 shows in more detail how a mesh node B can perform authentication with an AP 80 using the Station service 82, with another mesh node A as mesh 86, and also authenticate with a STA C using AP service 84. The mesh node B supports authentication services in its STA mode 82 and AP mode 84. The MESH mode 86 is enabled for authenticated data and management traffic from mesh peer node A. The authentication scheme can occur after the mesh discovery described above. It should be noted that the STA service 82 and/or AP service 84 might only need to be used for authentication purposes. After completing authentication, mesh node B may disengage the STA service 82 and/or AP service 84 and operate in mesh mode 86.

The 802.1x authentication application only manages nodes with the wireless mesh driver and only supports 802.1i RSN AES-CCMP encryption for Stations, Access Points, and mesh nodes. The key exchange protocol for Stations and Access Points is based on the 802.11i 4-way handshake for unicast and the 2-way handshake for multicast and may work over EAPOL. The wireless mesh driver offers an asynchronous EAPOL frame interface. The control application enables configuration of login id and password used for PEAP. The PEAP protocol [PEAP] is described in "Protected EAP Protocol," internet Draft, draft-josefsson-pppext-eap-tls-eap-06.txt, March 2003, which is herein incorporated by reference.

Mesh Security Innovations

The mesh security creates a mutually reversible supplicant and authenticator role for each node to enable two mesh peers to discover and authenticate each other without any dependence on pre-existing centralized infrastructure. Enhancements to the IEEE 802.11i security standard extend its functionality to mesh networks that are not currently envisioned by the standard. The mesh security also provides distributed authentication of mesh nodes joining a mesh. A key exchange methodology is also defined for unicast and multicast encrypted data distribution that also appropriate for a dynamic mobile mesh.

Changes to 802.11i to Support Mesh Functionality

The specific enhancements to the existing IEEE 802.11i standard to support mesh authentication are described below. The IEEE 802.11i standard [802.11i] is described in IEEE Std 802.11i-2004, IEEE Standard for Information Technology, Part 11: Wireless LAN Medium Access Control (MAC) and Physical Layer (PHY) specifications, Amendment 6: Medium Access Control (MAC) Security Enhancements, which is herein incorporated by reference.

PMKID Computation

In one embodiment, the Pairwise Master Key Identifier (PMKID) used for mesh nodes does not follow the 802.11i recommendation, as the role of a mesh node can change from acting as an authenticator to acting as a supplicant. Rather than picking a single MAC address to play the role of the Authenticator Address (AA) station, a convention is used where the AA station will be the station with the highest MAC address. AA is the address of the authenticator station. The PMKID computation changes from (page 76[802.11i]):

PMKID=hmac-sha1-128(PMK, "PMK Name" ||AA||SPA)

to

PMKID hmac-sha1-128(PMK, "PMK Name" ||MAX(AA|SPA)||MIN(AA||SPA)), where PMK is the Pairwise Master Key, SPA is the Supplicant Address, "PMK Name" is a Pairwise Master Key name string, hmac-sha1-128 is a hash algorithm, MAX finds the maximum value between AA and SPA MAC addresses, MIN finds the minimum value between AA and SPA MAC addresses and the "PMK Name" ||MAX(AA|SPA)||MIN(AA|SPA) are concatenated together and then used by the hashing algorithm along with the PMK to generate the PMKID value. This allows advertising of cache PMKIDs so that both nodes can compute the same PMKID.

EAP-MESH

This authentication method may use the EAP-TLS tunnel between two nodes and eliminates the need for the 4-way and 2-way handshakes and is described in more detail below. The EAP-TLS protocol [EAPTLS] is described in RFC-2716 PPP EAP TLS Authentication Protocol, which is herein incorporated by reference.

The EAP-TLA Node ID is used in 4-Way handshake where each mesh node is assigned a Node TD, which is 32 byte unique identifier. During message 2 and 3 of the 4-way handshake these values are exchanged. Each mesh node consults a device revocation list. If either mesh node is in the device revocation list, the mesh node which detects the invalid mesh node drops the authentication and immediately rotates its multicast key.

Mesh Node Authentication

Figure 12:
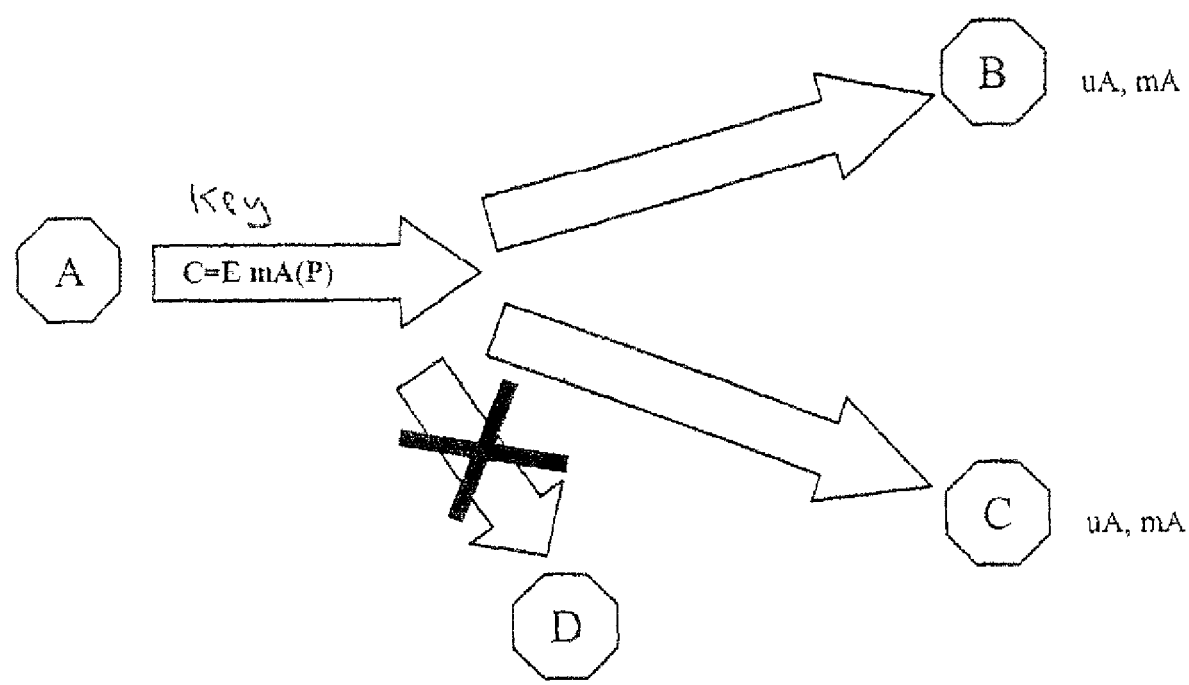
FIG. 12 is a diagram showing how a node distributes an encryption key.

FIG. 12 shows a unique mesh key management architecture for multicast keys. A typical infrastructure authentication will be shown between a supplicant and an authentication server that uses EAP-TLS. Then it will be shown how the packet exchange for mesh nodes is reduced without changing the security of the system.

The 802.1x protocol exchange, when used with an EAP method, facilitates derivation and installation of the encryption keys. Two keys are used: a unicast key and a broadcast/multicast key. There are no deviations from the standard 802.1x in deriving the unicast keys, but the broadcast/multicast keys use extensions to the standard.

Every node in the mesh establishes its own broadcast/multicast group. This group consists of the mesh nodes that have been directly authenticated at layer 2. The key is shared point-to-multipoint, tree fashion within this group. The mesh node that establishes the group distributes the key to the members of the group.

For example, in FIG. 12 a mesh node A constructs a multicast group including mesh nodes B and C and distributes key mA. This makes it possible to encrypt plaintext P with this key and send it once to all members of the group C=E mA(P). Mesh node D is not a member of the group, does not have the key, and cannot decrypt the message.

The multicast key cannot be used symmetrically for several reasons. If it were, then it would not be possible to maintain the group. The reason for this is the transient nature of the mesh. A mesh node would multicast to the members of its group. The members of the group would multicast to the members of their group using the same key such that confidentiality could not be preserved. Key maintenance, such as key rotation would also be very hard to implement. Roaming among different meshes and segmenting/merging of meshes would be hard to implement because the broadcast/multicast key would have mesh-wide scope.

Because of all these reasons, the broadcast/multicast key is unidirectional from the multicast source to the destinations. When two mesh nodes authenticate and associate, they both derive a unicast key and exchange their individual multicast key. Node A uses its multicast key to encrypt broadcasts/multicasts to node B. Node B uses its multicast key to encrypt broadcast/multicasts to node A. In this, the mesh differs from the way it is used in the infrastructure, as each node in the mesh is responsible for managing its own multicast key.

Figure 13:
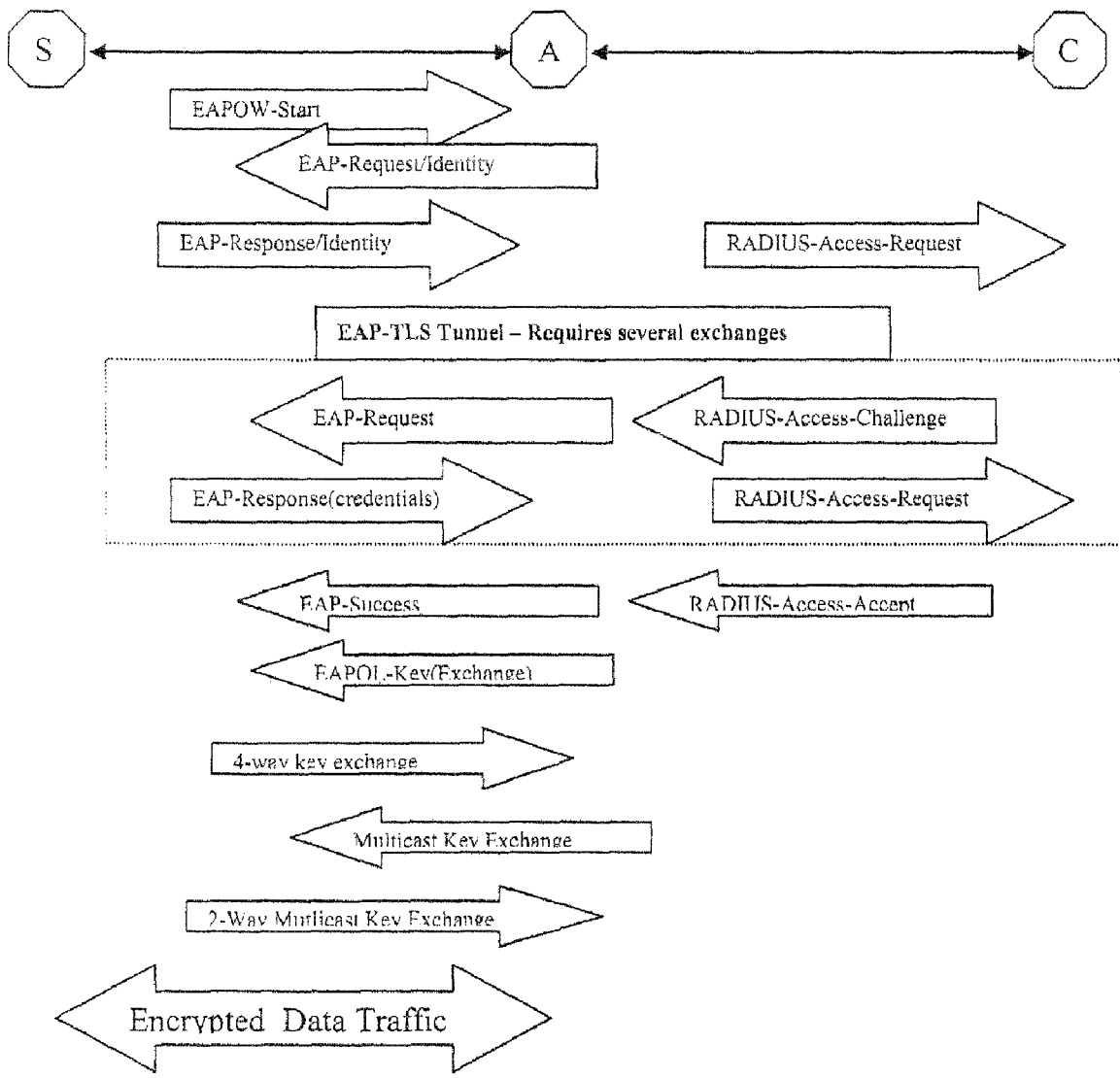
FIG. 13 shows a standard 802.1x authentication exchange.

FIG. 13 shows a standard 802.1x authentication exchange that involves a Supplicant (S), Authenticator (A), and Authentication Server (C). The authentication that takes place is between the STA and a remote Radius server C. The Radius protocol [RADIUS] is described in RFC-3580 IEEE-802.1x Remote Authentication Dial-In User Services (RADIUS) Usage Guidelines, which is herein incorporated by reference.

The TLS tunnel is between the STA S and the radius server C. The node B (authenticator or AP) basically forwards the TLS session. Because of this, after authentication has been successful between the STA S and the Radius Server C, the role of the Radius server C is over. The STA S and AP A must then use a byproduct secret from the TLS session to validate the AP.

The secret between the STA S and the Radius server C is called the Master Key (MK). The Radius server C generates a secret for node B to authenticate itself to the STA S. This secret is called the Pairwise Master Key (PMK) and is delivered to the AP A at the time the Radius Success message is delivered. The STA S has all the necessary data to generate the same PMK as the Radius server C.

Together the STA S and AP A work through the 4-way key exchange to derive a key called the Pairwise Transient Key (PTK). The PTK key can change each time a 4-way key exchange is initiated because it is dynamically generated by a combination of the PMK, two nonce values generated by the AP A and the STA S during the 4-way handshake.

Mesh Authentication Protocol and Key Exchange Based on EAP-TLS

Mesh nodes that implement an EAP-TLS profile can be authenticated more expediently by taking advantage of the established TLS tunnel between the mesh nodes. In one embodiment, the mesh nodes support EAP-TLS and the mesh authentication application is notified each time a mesh node association takes place. Because the node in the mesh that plays the role of the 802.1x authenticator server is the same as the one that plays the role of the authenticator, trust between the STA and the AP is established after a successful EAP-TLS exchange. Further verification of their identity is not necessary in the 4-way key exchange.

Figure 14:
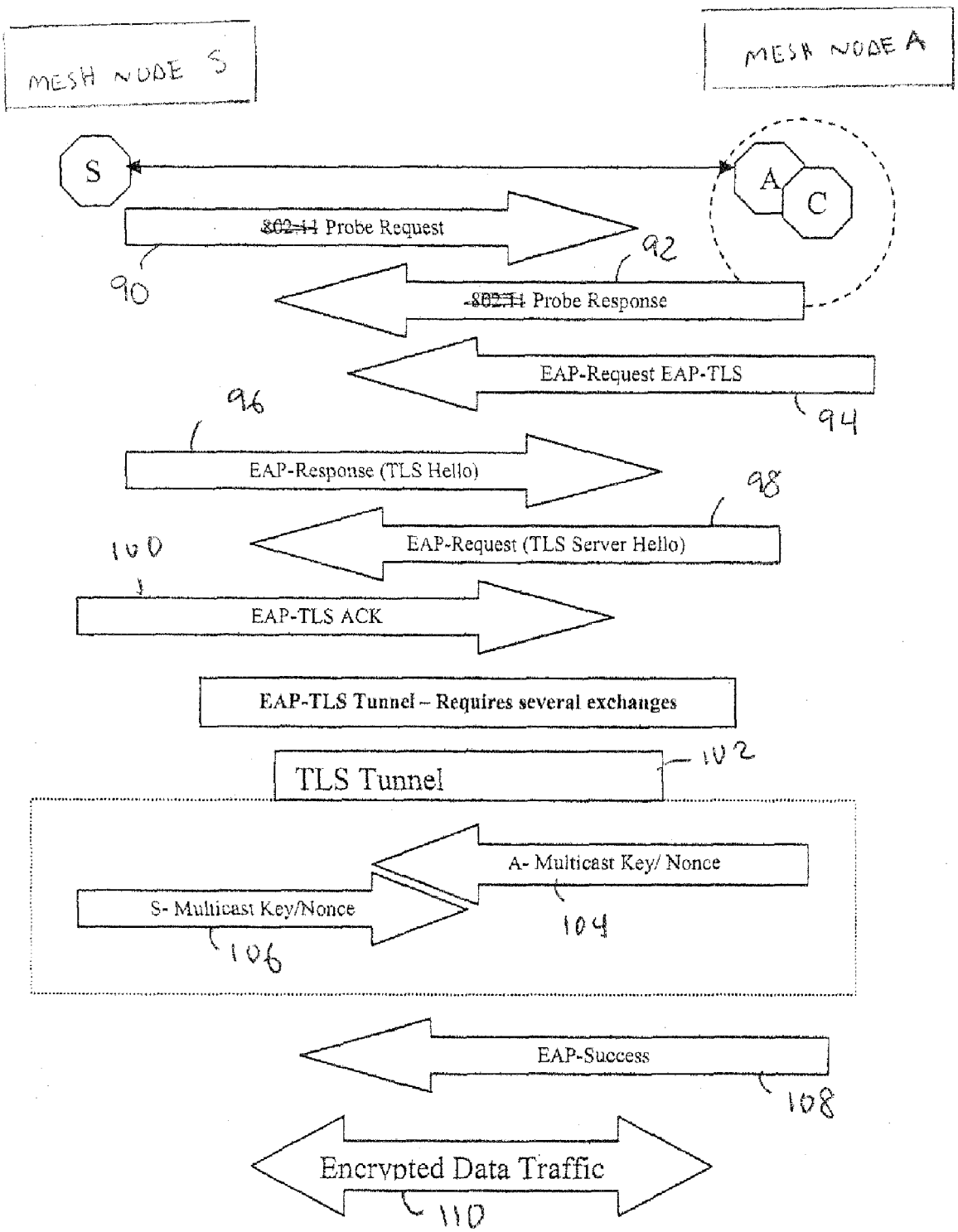
FIG. 14. is a diagram showing a key exchange used for mesh authentication.

Referring to FIG. 14, mesh authentication and key exchange protocols are described for two mesh nodes. In this example, an EAP-TLS key exchange establishes a security context, by using the TLS tunnel to exchange further key material.

The authentication process is initiated after a mesh association is agreed upon by two mesh nodes S and A. In this example, mesh node A also performs the authentication operations normally performed by the authentication server C. As described above in FIG. 4, both active and passive scanning can be used using both 802.11 management frames and mesh management frames. This 802.11 compliant and mesh scanning and discovery technique allows nodes S and A to first discover each other and then negotiate, if necessary, which will operate as a Station (supplicant) and which will operate as the AP (authenticator) for purposes of the authentication process.

One example of this negotiation is shown in FIG. 10 where random address values generated by the nodes are compared to determine which will operate as the AP authenticator and which will operate as the Station supplicant.

In this example, based on the probe request 90 sent by mesh node S and the probe response sent by mesh node A, it is determined that mesh node S operates as the supplicant (Station) and mesh node A will operate as the AP (authenticator) for purposes of completing the authentication and association process described below.

As described above, the authentication process begins with each node S and A receiving EAPOL frames from their respective wireless mesh drivers (after the wireless association). Referring to FIG. 14, and assuming mesh node A is the authenticator and mesh node S is the supplicant, the following operations are performed.

1. S sends TLS Hello message 96.
2. A sends TLS Server Hello message 98.
3. Nodes A & S validate each other's certificates following some validation guidelines.
4. The mesh node S receives a TLS change cipher and finish message. The mesh nodes S and A now have a secure TLS tunnel 102 between them.
5. At this point, both mesh nodes have mutually authenticated each other, and have established a PMK.
6. Mesh node S now completes the EAP-TLS handshake by transmitting its respective EAP-TLS ACK 100.
7. Mesh node A receives the EAP-TLS ACK 100 and starts the Mesh Unicast Key Derivation and Multicast Key Exchange protocol using the secure TLS tunnel 102.

The first packet 104 includes a nonce and its group key to S.
8. The mesh node S receives the peer multicast key 104 and sends its multicast key 106 and a nonce to mesh node A in the TLS tunnel 102. At this stage mesh node S has all the necessary key material to generate the PTK.
9. Mesh node A receives the peer multicast key in packet 106 and now has all the necessary key material to generate the PTK. Mesh node A now sends the EAP-Success packet 108 to the peer node S and installs the peer unicast and multicast key.
10. Mesh node S receives the EAP-Success packet 108 and installs the peer unicast and multicast key.
11. Encrypted data 110 can now be exchanged between the mesh peers S and A.

By using the EAP-TLS tunnel 102 between the peers S and A, the 4-Way handshake is skipped in the establishment of the security context. This 802.1x packet exchange for mesh nodes can also be shortened by eliminating the EAPOL-Start message, and the EAPOL-Key messages.

Mesh Nodes Multicast Key Rotation

The multicast key rotation in infrastructure mode is managed by the AP. The AP rotates the multicast key when a STA disassociates with the AP, or on a periodic basis. In a mesh where all nodes are peers, each mesh node manages its own multicast key.

The multicast key rotation for each mesh node can be performed using the standard 802.11i 2-way multicast exchange. A peer mesh node that wishes to rotate its multicast key will initiate the 2-way multicast exchange with each peer mesh node with an established active security association. The criteria used in determining when a mesh node rotates an associated multicast key is based on a random time interval, determined by each mesh node after each key rotation takes place. For example, the default window used for the rotation is between five and minutes. Additionally, with wireless mesh driver support, the key rotation can take place earlier when the wireless mesh driver detects that a remote mesh peer node is no longer in contact with the given mesh node, or when a node has been deleted from the mesh.

Mesh Nodes PMK Caching

Some of the problems faced in wireless networks include physical link reliability and node mobility. Mesh nodes that become separated for a period of time may rejoin at a later time.

At the time the nodes rejoin, they need to go though a full mesh authentication process. This can be a lengthy process if an EAP-TLS profile is used. Rather than going through a full authentication, it is possible to take advantage of any previous authentication between the peer mesh nodes and reuse the PMK.

By reusing the PMK established by peer mesh nodes in previous association, it is possible to shorten the process for securing the wireless link. The infrastructure mode described in the 802.11i specification uses the PMK at the APs to avoid the re-authentication process. In the mesh, it is possible to cache a PMK that has been derived through EAP-TLS for a period of time. Referring still to FIG. 14, the process may work as follows:

1. Mesh nodes S and A exchange probe messages. The Extensible Mesh Information Element 30 in the Mesh Probe Request frame 90 can advertise Pre-Shared Key support.

2. Node A starts the standard 802.11i 4-way key handshake in request 94 and both mesh nodes derive the PTK.
3. After message 2 of the 4-way key exchange, both mesh nodes possess the PTK and can use the PTK encryption and authentication keys in messages 3 and 4 to exchange each other's multicast key together with their respective Node IDs.
4. At this point, encrypted communications 110 can begin between mesh nodes S and A.

This exchange is faster because it avoids the TLS public cryptography computations and reduces the number of packets exchanged between nodes.

Mesh Node Re-Authentication

In infrastructure (BS S) mode, the AP is responsible for initiating the re-authentication process with each STA. This process is used to check for hijacked sessions and to create new unicast keys upon successful authentication. This process requires authentication with a Radius server. In the case of mesh nodes, the 4-way key exchange is periodically re-initiated to re-authenticate the mesh peers and generate new unicast keys.

Mesh Node Authentication with WPA2-PSK

The mesh authentication system uses the key exchange specified in the 802.11 standard for WPA2-PSK. It uses the message 2 and 3 of the exchange to transmit each mesh node's Node ID. Each mesh node is responsible for validating the Node ID against its Device Revocation List (DRL). If a Node ID exists in the DRL, the mesh node detecting the revoked Node ID stops the authentication with the revoked mesh node. This implementation of WPA2-PSK uses the 4-way handshake to exchange the TX/RX Unicast Key.

Example Architecture

Figure 15:
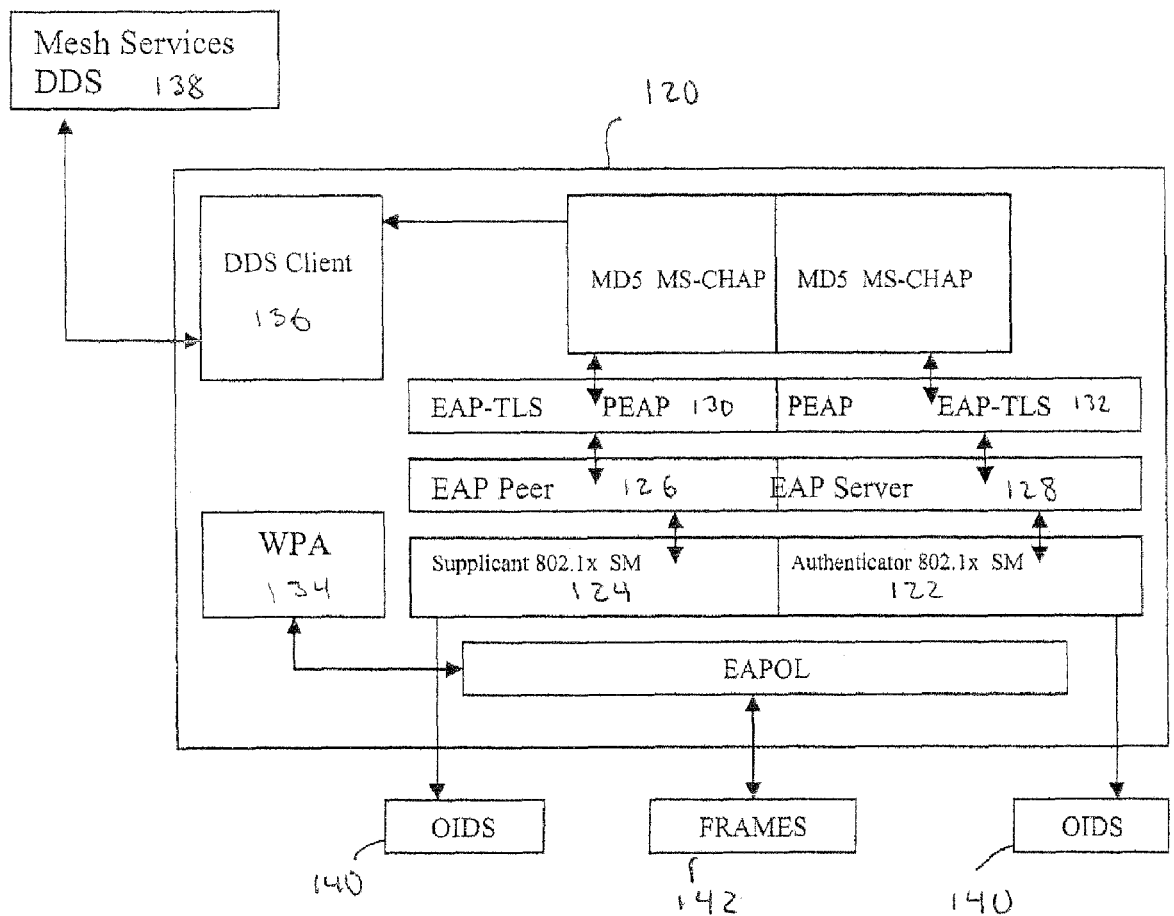
FIG. 15 is a block diagram showing a mesh authentication architecture.

FIG. 15 shows an example mesh authentication application (from here on referred to as MAUTH) that includes an 802.1x authenticator and supplicant state machines 122 and 124, an LAP peer 126 and EAP server 128, an EAP-TLS peer and PEAP peer 130 and an EAP-TLS service and PEAP server 132. The MAUTH 120 also includes an RSN WPA peer and server 134.

The MAUTH 120 can be a service to higher level applications, and can operate under application control. The control application can start MAUTH 120 by providing the following information:

1. The location of the device certificate
2. The location of the certificate private key
3. The location of the root certificates
4. The wireless mesh driver device ID MAUTH 120 uses a data distribution service (DDS) to obtain the following pieces of information:
1. The location of the Device Revocation List
2. The Certificate Trust List
3. A list of APs (MACs, SSIDs, and credentials) to use when the mesh node detects a network. This is the list of "profiles." The profiles determine which infrastructure or mesh networks the node can connect to.

FIG. 15 illustrates the interaction of MAUTH 120 with the control application and the interaction to a wireless mesh driver. The MAUTH 120 authenticates, manages and provides key material for a point-to-point relationship between a mesh node and its peer regardless of the authentication path taken: AP, STA or MESH.

The MAUTH architecture 120 views all its connecting mesh peers as point-to-point connections, which are reflected in communications to the wireless mesh driver. The MAUTH architecture 120 learns from the wireless mesh driver several pieces of information when a wireless mesh node is first contacted. This information can be used to select the method of authentication and the treatment of key material for the mesh node. The communication between the upper-layer mesh services and MAUTH 120 is through a Data Distribution System (DDS) 136,138. Depending on the authentication protocol, MAUTH 120 may query a DDS server 138 to obtain a set of credentials.

Wireless Mesh Driver Communication

The MAUTH architecture 120 communicates to the wireless mesh driver using a data packet and through the use of control commands referred to as ObjectIDs, or OIDs 140. Upon startup, MAUTH 120 connects to the wireless mesh driver using, for example, the Windows CreateFile( ) API. This device handle is then used to retrieve the device MAC address. The next step binds to the wireless mesh driver data path for exchanging EAPOL frames 142.

The EAPOL frames 142 are used for the purpose of exchanging authentication and key messages with remote mesh peers as specified by [80211i] and [8021x]. The wireless mesh driver can take advantage of this communication path and inject a proprietary EAPOL frame to MAUTH 120 when a new wireless node is detected by the wireless mesh driver (an association takes place). The wireless mesh driver EAPOL frame 142 for example may follow the format shown in table 7.

TABLE 7

| Parameter | Value | Bytes | Offset |
| --- | --- | --- | --- |
| DST MAC Address | Our MAC Address | 6 | 0 |
| SRC MAC Address | Peer MAC Address | 6 | 6 |
| PAE Ether Type | 0x888E | 2 | 12 |
| Protocol Version | 0x01 | 1 | 14 |
| Packet Type | 0xFF | 1 | 15 |
| Packet Length | 0x02-0x40 | 2 | 16 |
| Node Type | STA = 0x01 | AP = 0x02 | 1 | 18 |
| Mesh Node | YES = 0x01 | NO = 0x00 | 1 | 19 |
| Number of SSIDs | 1 – N | 1 | 20 |
| SSID | 1 … N | 32 | |

EAPOL Wireless Mesh Driver Frame

Upon receipt of this frame type, MAUTH 120 learns the MAC address of the remote mesh peer and the list of matching SSIDs. The SSIDs are then used to select a wireless profile that can be used to authenticate the remote mesh peer. If the SSID matches a wireless profile for WPA-PSK (Pre-Shared Key), an AP 4-Way Handshake is started. If the SSID matches an EAP profile, the 802.1x authentication is started.

The set of OIDs used for controlling the wireless mesh driver may include the following.

AUTH_KEYS_ADD: The MAC address associated with this mesh peer uses the following keys: Tx/Rx Unicast Key, Tx Multicast/Broadcast Key, Rx Multicast/Broadcast Key. In the infrastructure (BSS) mode of communication the TX and RX Multicast/Broadcast Key is the same, but in mesh mode the TX and RX key are different.

AUTH_KEYS_DELETE: The MAC address in this message will have its keys deleted, and the remote mesh peer will be removed from the wireless mesh driver association table.

AUTH_GET_RSN_IE: The RSN 4-way key exchange requires the use of the Extensible Mesh Information Elements from the Mesh Beacon and Mesh Probe Response frames. This information needs to be retrieved from the wireless mesh driver.

The MAUTH 120 manages many EAPOL streams and de-multiplexes the streams based on source MAC addresses. In order to manage multiple EAPOL streams, the wireless mesh driver frame interface must provide asynchronous I/O support.

Application Communication

The MAUTH 120 interacts with the control application in three areas: login ID validation, profile table management, and management controls. For login validation, a DDS store is consulted. For the profile table management, a DDS query and notification mechanism is used. For management, the control application notifies MAUTH 120 to exit, or the wireless mesh driver generates an event.

AP Authentication of STA Nodes

The MAUTH 120 performs AP authentication to STA nodes and mesh nodes that lack the proper certificate credentials to authenticate with a desired mesh. This combination leads to the following matrix:
1. STA node, without mesh software and without credentials.
   The user configures its wireless interface to contact and trust the AP credentials, through the SSID. The AP authenticates the login with PEAP or WPA-PSK. In the case where PEAP is used, MAUTH validates the user login by consulting the DDS store.
2. The STA node, with mesh software, and without credentials.

authentication server protocol as stated in [8021x]. The resulting key material is used to generate a peer TX/RX unicast key. The AP will generate a random multicast key upon initialization and will distribute this key to all STA nodes that authenticate with the AP. The multicast key will be subject to key rotation, and STA nodes will be subject to 802.1x re-authentication phase. The algorithm for multicast keys is defined by the AP policy such as rotation over a timer interval and every time an STA disassociates from the AP.

Authentication Profile Table

The MAUTH 120 performs 802.1x supplicant authentication to peer mesh nodes and 3rd party APs that are considered trusted. This trust is determined by the entries in the authentication profile table shown in Table 8.

The supplicant method of authentication used with 3rd party APs can be WPA2-PSK, EAP-TLS, PEAP with MD5 and PEAP with MS-CHAPv2, or additional authentication methods defined in future versions of the [8021i] standard or its successors. The EAP-TLS and WPA-PSK authentication methods are supported with peer mesh nodes and client STAs, or additional authentication methods defined in future versions of the [8021i] standard or its successors.

The MAUTH 120 fetches the wireless profiles from the DDS store. The information required for the wireless profile is divided into mesh profiles and AP profiles. The AP profiles designate APs to which a mesh node can establish an infrastructure (BSS) association. Table 8 shows the type of information needed for both profiles.

TABLE 8

Authentication Profile Table

| Profile Type | SSID | 802.11 Encryption Method | 802.1x Auth Method | Login ID | Pass Phrase | Certificate | Private Key | Validate AP Certificate |
|---|---|---|---|---|---|---|---|---|
| AP | Jack | TKIP | EAP-TLS | n/a | Secret | path/name | path/name | Yes |
| AP | pol | AES | PEAP MD5 | uname | Upasswd | n/a | N/A | Yes |
| MESH | SFPD | AES | WPA-PSK | n/a | Thsi 7949841 Mesh++!\ | n/a | n/a | n/a |
| MESH | CCPD | AES | EAP-TLS | n/a | n/a | n/a | n/a | n/a |

The user through mesh software will have to configure the wireless mesh driver to associate to the AP and trust the AP credentials. Depending on the AP configuration, PEAP or WPA-PSK can be used for authentication.
3. STA node, with mesh software, and with credentials.
   The AP authenticates the login with EAP-TLS or WPA-PSK.
4. The mesh node, without credentials.
   The user through mesh software will have to configure the wireless mesh driver to associate to the AP SSID and trust its credentials. The AP will authenticate the login with PEAP or WPA-PSK. If the AP uses PEAP, MAUTH 120 validates the user login by consulting the DDS store.

The distinction of these cases is important because the application may need to implement these features in order to support this mode of operation which enables field provisioning of credentials.

In the authentication of STA nodes through the AP interface, MAUTH 120 may follow the 802.1x authenticator and The use of PEAP can be tied to the login ID in Table 8 or the entry in Table 8 could specify that the login ID must be prompted. An entry of this type can trigger an L2_PROMPT_LOGIN_PASSWD RCP to the application to prompt for credentials. The column, "Validate AP Certificate," indicates whether MAUTH 120 can bypass the certificate validation of the server. The ability to do this under user control allows nodes without credentials to authenticate. It also allows nodes from different agencies to exchange certificates. The Table 8 installed in MAUTH 120 can be under application control. In the authentication of STA nodes to 3rd party APs, MAUTH follows the supplicant 802.1x protocol as stated in [8021x].

SUMMARY

Thus, the mesh discovery protocol (MDP) facilitates wireless node discovery on a peer-to-peer basis. To join a mesh network, nodes are not dependent on membership managed by any centrally administered network device but can still coexist with existing 802.11 standards. The 802.11 management and control frames that can not be changed, or if changed, can remain backwards compatible. Thus, mesh information can be transmitted in such a way that it is not interpreted incorrectly by the standard 802.11 protocol participants such as STAs and APs.

The MDP can be defined and function with a single unconnected node as well as a connected node in the process of sending data packets. For example, the scanning algorithm can be optimized for both of these use cases. The MDP can also enable authentication of peer mesh nodes with each other by standard exchange sequences after initial discovery occurs. These exchange sequences can be based on the IEEE 802.11i Std [80211i] security protocol suite, with unique extensions to address new requirements for mesh networks. As a result of the discovery and authentication, mesh nodes can be joined by point-to-point links which support encryption for both unicast and multicast traffic.

The MDP can support mesh network partitioning (the splitting of a large mesh network into two smaller mesh networks) and mesh network re-joining where two smaller mesh networks are combined into a large mesh network. The MDP also allows mesh nodes to discover and associate to infrastructure APs while concurrently maintaining connectivity to other mesh nodes.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A mesh node, comprising:
a processor that operates as a Station service for scanning different channels configured for a network, authenticating and associating with Access Point (AP) nodes and mesh nodes;
the processor also operating as an AP service for scanning, authenticating, and associating with Station nodes and mesh nodes on the same radio interface as when the processor operates as a Station service;
the processor also dynamically configuring mutually reversible authenticator and supplicant authentication services with peer nodes according to the type of discovered peer nodes and peer addresses independently of any pre-existing centralized mesh authentication infrastructure; and
generating Pairwise Master Key Identifiers (PMKIDs) for individual peer-to-peer connections with the peers according to local and peer addresses, wherein computing the PMKIDs is according to the following:

PMKID=HASH(PMK, "PMK Name" ||MAX(AA|SPA)|| MIN(AA|SPA)), where PMK is the Pairwise Master Key, AA is the Authenticator MAC Address, SPA is the Supplicant MAC Address, PMK Name is a character string for the PMK, and HASH is a hashing operation.

2. The mesh node according to claim 1 wherein the processor is configured when operating the Station service or AP service or to check for either a Service Set Identifier (SSID) or an Extensible Mesh Information Element (EMIE) in received discovery messages and operate in a conventional 802.11 mode when the discovery messages include the SSID and operate in a mesh mode when the discovery messages include the EMIE.

3. The mesh node according to claim 1 wherein the processor is configured when operating the Station service or the AP service to send both 802.11 probe request frames and mesh probe request frames.

4. The mesh node according to claim 1 wherein the processor is configured to use a random token negotiated with a peer to determine whether to operate as the AP service or the STA service.

5. The mesh node according to claim 1 wherein the processor is configured to associate with other peer nodes according to different factors associated with layer-1, layer-2 and layer-3 of the Open System Interconnect (OSI) model.

6. The mesh node according to claim 5 wherein the processor conducts different layer-1 channel scans for discovering other peer nodes according to current associations with other nodes.

7. The mesh node according to claim 5 wherein the processor associates with the peer nodes according to different layer-2 connectivity information and/or layer-3 forwarding information received in Extensible Mesh Information Elements (EMIEs) from the peer nodes.

8. The mesh node according to claim 6 wherein the processor also associates with the peer nodes according to pre-configured policy values associated with the peer nodes.

9. The mesh node according to claim 1 including the processor conducting authentication with the peer nodes using a single authentication operation between the dynamically configured supplicant and the dynamically configured authenticator.

10. A method for authenticating devices in a wireless network, comprising:
dynamically configuring mutually reversible authenticator and supplicant services with peers, wherein the authenticator and supplicant are identified according to the type of peers and peer addresses discovered in the wireless network independently of any pre-existing centralized mesh authentication infrastructure; and
generating Pairwise Master Key Identifiers (PMKIDs) for individual peer-to-peer connections with the peers according to local and peer addresses, wherein computing the PMKIDs is according to the following:

PMKID=HASH(PMK, "PMK Name" ||MAX(AA|SPA)|| MIN(AA|SPA)), where PMK is the Pairwise Master Key, AA is the Authenticator MAC Address, SPA is the Supplicant MAC Address, PMK Name is a character string for the PMK, and HASH is a hashing operation.

11. The method according to claim 10 including conducting authentication with the peers using a single authentication operation between the dynamically configured authenticator and the dynamically configured supplicant.

12. The method according to claim 10 including:
discovering different Access Point (AP) peers, Station peers, or mesh peers in the wireless network;
dynamically operating a Station service as an authenticator for authenticating with discovered AP peers;
dynamically operating an AP service as a supplicant for authenticating with discovered Station peers.

13. The method according to claim 12 including:
negotiating with discovered mesh peers for operating as the authenticator or the supplicant; and
dynamically configuring the Station service or the AP service for authenticating with the discovered mesh peer according to the negotiation.

14. The method according to claim 13 including negotiating with the mesh peers to operate as the authenticator or the supplicant according to which has the highest Media Access Control (MAC) address.

15. The method according to claim 10 including operating in a mesh mode after completing the authentication using the AP or Station service to authenticate peers.

16. The method according to claim 10 including generating the PMKID value according to which local or peer has a higher MAC address.

17. The method according to claim 10 including pre-configuring individual nodes for generating Pairwise Master Keys (PMKs) and then using the PMKs in the individual nodes to generate a single Pairwise Master Key Identifier (PMKID) for individual peer-to-peer connections and then using the PMKIDs to encrypt data exchanges between the individual peer-to-peer connections.

* * * * *